United States Patent
Kinomura

(10) Patent No.: US 11,897,359 B2
(45) Date of Patent: Feb. 13, 2024

(54) ELECTRIC POWER SYSTEM AND ELECTRIC POWER CALCULATION METHOD

(71) Applicant: TOYOTA JIDOSHA KABUSHIKI KAISHA, Toyota (JP)

(72) Inventor: Shigeki Kinomura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 11 days.

(21) Appl. No.: 17/814,733

(22) Filed: Jul. 25, 2022

(65) Prior Publication Data

US 2023/0034916 A1 Feb. 2, 2023

(30) Foreign Application Priority Data

Jul. 29, 2021 (JP) .................................. 2021-124173

(51) Int. Cl.
*B60L 53/66* (2019.01)
*B60L 55/00* (2019.01)
(Continued)

(52) U.S. Cl.
CPC ............. *B60L 53/665* (2019.02); *B60L 55/00* (2019.02); *H02J 3/322* (2020.01); *H02J 7/0068* (2013.01);
(Continued)

(58) Field of Classification Search
CPC .... B60L 53/665; B60L 55/00; B60L 2210/30; B60L 2210/40; B60L 3/12; B60L 53/14; B60L 53/20; B60L 53/68; H02J 3/322; H02J 7/0068; H02J 7/02; H02J 2207/20; Y02T 10/70; Y02T 10/7072; Y02T 90/12; Y02T 90/16; Y02T 90/167

See application file for complete search history.

(56) References Cited

U.S. PATENT DOCUMENTS

2015/0241896 A1    8/2015  Nishibayashi et al.
2018/0272881 A1*   9/2018  Kojima .................. B60L 53/31
(Continued)

FOREIGN PATENT DOCUMENTS

JP    2011-166971 A    8/2011
JP    2015-162986 A    9/2015

*Primary Examiner* — Rexford N Barnie
*Assistant Examiner* — Terrence R Willoughby
(74) *Attorney, Agent, or Firm* — Finnegan, Henderson, Farabow, Garrett & Dunner, LLP

(57) ABSTRACT

An electric power system includes a vehicle, a vehicle management server, an AC charging stand, a DC charging stand, and a charging stand management server. During AC charging and AC discharging, the AC charging stand is connected to the vehicle. An amount of charging power during AC charging and an amount of discharging power during AC discharging are calculated by the vehicle. The vehicle measures electric power before power conversion by an on-board charger, and calculates an amount of charging power and an amount of discharging power. An amount of charging power during DC charging and an amount of discharging power during DC discharging are calculated by the DC charging stand. The DC charging stand measures electric power before power conversion by a charger, and calculates an amount of charging power and an amount of discharging power.

8 Claims, 18 Drawing Sheets

(51) Int. Cl.
*H02J 7/00* (2006.01)
*H02J 7/02* (2016.01)
*H02J 3/32* (2006.01)

(52) U.S. Cl.
CPC ............. *H02J 7/02* (2013.01); *B60L 2210/30* (2013.01); *B60L 2210/40* (2013.01); *H02J 2207/20* (2020.01)

(56) References Cited

U.S. PATENT DOCUMENTS

2018/0272884 A1* 9/2018 Kojima .................. B60L 53/665
2021/0003408 A1   1/2021 Nakamura
2022/0407320 A1* 12/2022 Filice .................. H01M 50/249

\* cited by examiner

ELECTRIC POWER SYSTEM AND ELECTRIC POWER CALCULATION METHOD

This nonprovisional application is based on Japanese Patent Application No. 2021-124173 filed on Jul. 29, 2021 with the Japan Patent Office, the entire contents of which are hereby incorporated by reference.

BACKGROUND

Field

The present disclosure relates to an electric power system and an electric power calculation method.

Description of the Background Art

Japanese Patent Laying-Open No 2011-166971 discloses a power supply system that can notify a vehicle's user of the progress of charging of an on-vehicle battery. The power supply system includes a power supply stand, a terminal unit used by the user, and a server that communicates with the power supply stand and the terminal unit. The power supply stand measures electric power supplied to the on-vehicle battery via a charging cable and transmits measurement results to the server. The server computes the progress of charging of the on-vehicle battery by referring to the measurement results received from the power supply stand and charging characteristic data of the on-vehicle battery (see Japanese Patent Laying-Open No. 2011-166971).

SUMMARY

For example, when a vehicle is used as a distributed energy resource (DER) of a virtual power plant (VPP), the amount of charging power supplied from a grid to the vehicle and the amount of discharging power supplied from the vehicle to the grid need to be measured accurately.

Charging stands that supply electric power to vehicles include alternating current (AC) charging stands that supply AC to vehicles and direct current (DC) charging stands that supply DC to vehicles. In AC charging of charging an on-vehicle battery with AC power supplied from the AC charging stand, an on-vehicle charger converts AC power to DC power In DC charging of charging an on-vehicle battery with DC power supplied from the DC charging stand, a charger of the DC charging stand converts AC power to DC power.

The conversion from AC power into DC power causes a power conversion loss. If both of the measurement of electric power before conversion into DC power and the measurement of electric power after conversion into DC power are performed, the amount of charging power cannot be calculated accurately. This is true for the amount of discharging power.

The present disclosure has been made to solve the above problem. An object of the present disclosure is to accurately measure an amount of charging power supplied to a vehicle and an amount of discharging power taken out of the vehicle.

An electric power system according to an aspect of the present disclosure includes: a vehicle that performs external charging of charging a battery with electric power supplied from outside the vehicle, and external discharging of supplying electric power of the battery to outside the vehicle; a charging stand that transfers electric power between an AC power supply outside the vehicle and the vehicle in the external charging and the external discharging; and a server that communicates with the vehicle and the charging stand. In the external charging and the external discharging, when electric power transferred between the vehicle and the charging stand is AC power, the vehicle includes a first charger that converts AC power supplied from the charging stand into DC power and converts DC power supplied from the battery into AC power, and a first detector that detects electric power input to and output from the first charger, and the vehicle measures charging power supplied from the charging stand or discharging power supplied to the charging stand using a detection value of the first detector, and transmits, to the server, a first measurement value that is a result of the measurement. In the external charging and the external discharging, when the electric power transferred between the vehicle and the charging stand is DC power, the charging stand includes a second charger that converts AC power supplied from the AC power supply into DC power and converts DC power supplied from the vehicle into AC power, and a second detector that detects electric power input to and output from the second charger, and the charging stand measures charging power supplied to the vehicle or discharging power supplied from the vehicle using a detection value of the second detector, and transmits, to the server, a second measurement value that is a result of the measurement.

With the above configuration, in external charging, charging power before conversion of AC power into DC power by the first charger or the second charger is measured, and a result of the measurement is calculated (an amount of charging power or an amount of discharging power). In external discharging, discharging power before conversion of DC power into AC power by the first charger or the second charger is measured, and a result of the measurement is calculated (an amount of charging power or an amount of discharging power). Accordingly, the calculated amount of charging power and the calculated amount of discharging power include no loss amount of power conversion. The amount of charging power and the amount of discharging power can thus be calculated accurately. The amount of charging power and the amount of discharging power calculated accurately are transmitted to the server and are utilized in management of electric power or the like.

In one embodiment, the vehicle and the charging stand are configured to communicate with each other. The charging stand is configured to transmit the second measurement value to the vehicle. The vehicle is configured to transmit the second measurement value to the server.

With the above configuration, the second measurement value calculated by the charging stand is transmitted to the server via the vehicle. As a result, the second measurement value can be transmitted to the server also when the charging stand and the server fail to communicate with each other.

In one embodiment, when the charging stand fails to communicate with the server, the charging stand transmits the second measurement value to the vehicle.

For example, the charging stand and the server may fail to communicate with each other due to a communication failure or the like. With the above configuration, in such a case, the second measurement value can be transmitted to the server via the vehicle.

In one embodiment, the vehicle and the charging stand are configured to communicate with each other. The vehicle is configured to transmit the first measurement value to the charging stand. The charging stand is configured to transmit the first measurement value to the server.

With the above configuration, the first measurement value calculated by the vehicle is transmitted to the server via the charging stand. As a result, the first measurement value can be transmitted to the server, for example, also when the vehicle and the server fail to communicate with each other.

In one embodiment, when the vehicle fails to communicate with the server, the vehicle transmits the first measurement value to the charging stand.

For example, the charging stand and the server may fail to communicate with each other due to a communication failure or the like. With the above configuration, in such a case, the first measurement value can be transmitted to the server via the charging stand.

In one embodiment, the server includes a first server that manages the vehicle, and a second server that manages the charging stand. The first server and the second server are configured to communicate with each other. The vehicle transmits the first measurement value to the first server. The charging stand transmits the second measurement value to the second server. The first server and the second server share the first measurement value and the second measurement value.

An electric power calculation method according to another aspect of the present disclosure is a method of calculating, in an electric power system including a vehicle, a charging stand, and a server, an amount of electric power transferred by the vehicle. The vehicle is configured to perform external charging of charging a battery with electric power supplied from outside the vehicle, and external discharging of supplying electric power of the battery to outside the vehicle. The charging stand is configured to transfer electric power between an AC power supply outside the vehicle and the vehicle in the external charging and the external discharging. In the external charging and the external discharging, when electric power transferred between the vehicle and the charging stand is AC power, the vehicle includes a first charger that converts AC power supplied from the charging stand into DC power and converts DC power supplied from the battery into AC power, and a first detector that detects electric power input to and output from the first charger. The method includes: measuring, by the vehicle, charging power supplied from the charging stand or discharging power supplied to the charging stand using a detection value of the first detector; and transmitting, by the vehicle to the server, a first measurement value that is a result of the measurement. In the external charging and the external discharging, when electric power transferred between the vehicle and the charging stand is DC power, the charging stand includes a second charger that converts AC power supplied from the AC power supply into DC power and converts DC power supplied from the vehicle into AC power, and a second detector that detects electric power input to and output from the second charger. The method further includes: measuring, by the charging stand, charging power supplied to the vehicle or discharging power supplied from the vehicle using a detection value of the second detector; and transmitting, by the charging stand to the server, a second measurement value that is a result of the measurement.

An electric power system according to another aspect of the present disclosure includes: a vehicle that performs external charging of charging a battery with electric power supplied from outside the vehicle, and external discharging of supplying electric power of the battery to outside the vehicle; a charging stand that transfers electric power between an AC power supply outside the vehicle and the vehicle in the external charging and the external discharging; and a server that communicates with the charging stand. In the external charging and the external discharging, when electric power transferred between the vehicle and the charging stand is AC power, the charging stand includes a first detector that detects charging power supplied to the vehicle and discharging power supplied from the vehicle, and measures the charging power or the discharging power using a detection value of the first detector, and transmits, to the server, a first measurement value that is a result of the measurement. In the external charging and the external discharging, when the electric power transferred between the vehicle and the charging stand is DC power, the charging stand includes a charger that converts AC power supplied from the AC power supply into DC power and converts DC power supplied from the vehicle into AC power, and a second detector that detects electric power input to and output from the charger, and the charging stand measures charging power supplied to the vehicle or discharging power supplied from the vehicle using a detection value of the second detector, and transmits, to the server, a second measurement value that is a result of the measurement.

An electric power system according to another aspect of the present disclosure includes: a vehicle that performs external charging of charging a battery with electric power supplied from outside the vehicle, and external discharging of supplying electric power of the battery to outside the vehicle; a charging stand that transfers electric power between an AC power supply outside the vehicle and the vehicle in the external charging and the external discharging; and a server that communicates with the vehicle. In the external charging and the external discharging, when electric power transferred between the vehicle and the charging stand is AC power, the vehicle includes a charger that converts AC power supplied from the charging stand into DC power and converts DC power supplied from the battery into AC power, and a first detector that detects electric power input to and output from the charger, and the vehicle measures charging power supplied from the charging stand or discharging power supplied to the charging stand using a detection value of the first detector, and transmits, to the server, a first measurement value that is a result of the measurement. In the external charging and the external discharging, when electric power transferred between the vehicle and the charging stand is DC power, the vehicle includes a second detector that detects charging power supplied from the charging stand and discharging power supplied to the charging stand, and the vehicle measures the charging power or the discharging power using a detection value of the second detector, and transmits, to the server, a second measurement value that is a result of the measurement.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
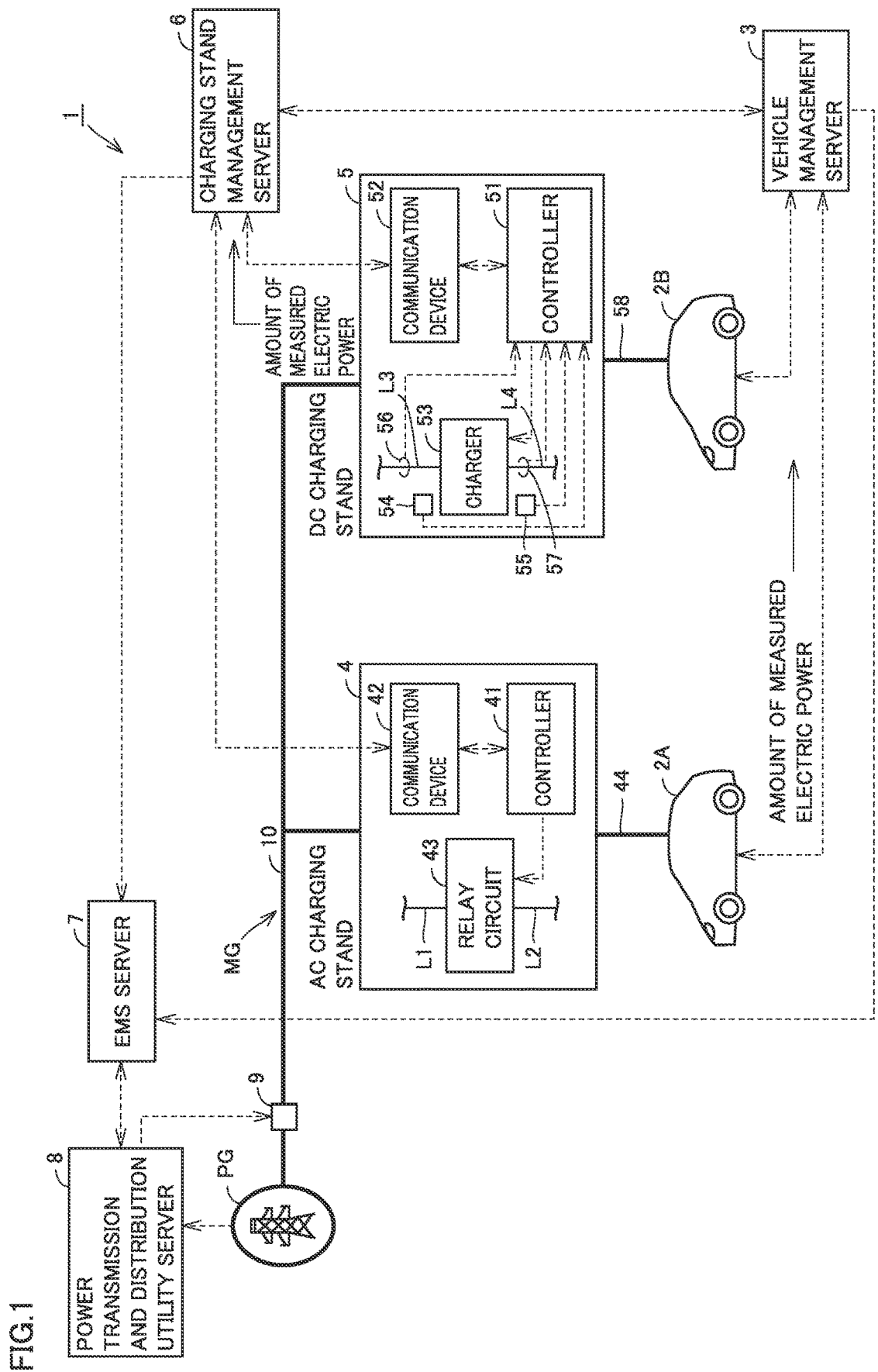
FIG. 1 shows a schematic configuration of an electric power system according to Embodiment 1.

Embodiments of the present disclosure will now be described in detail with reference to the drawings. The same or corresponding elements in the drawings have the same reference characters allotted, and description thereof will not be repeated.

Embodiment 1

<Configuration of Electric Power System>

FIG. 1 shows a schematic configuration of an electric power system 1 according to Embodiment 1. Electric power system 1 according to Embodiment 1 includes a power grid PG, a microgrid MG, vehicles 2A, 2B, a vehicle management server 3, an AC charging stand 4, a DC charging stand 5, a charging stand management server 6, an energy management system (EMS) server 7, a power transmission and distribution utility server 8, and a power reception and transformation facility 9. Vehicles 2A, 2B, vehicle management server 3, AC charging stand 4, DC charging stand 5, and charging stand management server 6 constitute a charging system. The charging system functions as a power adjustment resource (distributed energy resource: DER) in microgrid MG. In addition to the charging system as described above, a factory energy management system (FEMS), a building energy management system (BEMS), a home energy management system (HEMS), a generator, a variable renewable energy, an energy storage system (ESS) or the like, each of which is not shown, may be included as the power adjustment resource.

Microgrid MG is a power network that supplies electric power to one city (e.g., a smart city) as a whole. Supply and demand of electric power in microgrid MG is managed by EMS server 7. A plurality of power adjustment resources are connected by a power distribution system 10 in microgrid MG. Microgrid MG is configured to be connected to and disconnected from power grid PG.

Power transmission and distribution utility server 8 is a computer that manages supply and demand of power grid PG. Power grid PG is a power network constructed by a power plant (not shown) and a power transmission and distribution facility. In Embodiment 1, a power company serves as a power generation utility and a power transmission and distribution utility. The power company corresponds to a general power transmission and distribution utility, and maintains and manages power grid PG (commercial power grid). The power company corresponds to a manager of power grid PG. Power transmission and distribution utility server 8 belongs to the power company.

Power reception and transformation facility 9 is provided at a point of interconnection (power reception point) of microgrid MG and is configured to switch between connection (parallel in) and disconnection (parallel off) between power grid PG and microgrid MG. Power reception and transformation facility 9 is located at a point of connection between microgrid MG and power grid PG.

When microgrid MG is performing an interconnected operation while being connected to power grid PG, power reception and transformation facility 9 receives AC power from power grid PG, down-converts the received power, and supplies the down-converted power to microgrid MG. When microgrid MG is performing an isolated operation while being disconnected from power grid PG, electric power is not supplied from power grid PG to microgrid MG. Power reception and transformation facility 9 includes a high-voltage-side (primary-side) switch (e.g., a section switch, an isolator, a breaker, and a load switch), a transformer, a protection relay, a measurement instrument, and a controller. EMS server 7 is configured to receive information (e.g., a power waveform) on microgrid MG from power reception and transformation facility 9 and indicate connection and disconnection to power reception and transformation facility 9.

EMS server 7 is configured to communicate with each of power transmission and distribution utility server 8, vehicle management server 3, and charging stand management server 6. A communication protocol may be OpenADR. EMS server 7 may perform demand response (DR) to the power adjustment resource when it is requested to adjust supply and demand of power grid PG from power transmission and distribution utility server 8. When the power adjustment resource includes vehicles 2A, 2B, AC charging stand 4, and DC charging stand 5, EMS server 7 may perform DR to vehicle management server 3 and charging stand management server 6. EMS server 7 may perform DR to the power adjustment resource in response to a request from a supply and demand adjustment market. EMS server 7 may perform DR to the power adjustment resource in order to adjust supply and demand of microgrid MG.

Charging stand management server 6 is a server that manages AC charging stand 4 and DC charging stand 5 electrically connected to microgrid MG. The power adjustment resource includes one AC charging stand 4 and one DC charging stand 5 in Embodiment 1, but it may include any number of such charging stands.

Charging stand management server 6 is configured to communicate with each of vehicle management server 3 and EMS server 7. Charging stand management server 6 is also configured to communicate with each of AC charging stand 4 and DC charging stand 5. Charging stand management server 6 manages an amount of electric power supplied (an amount of charging power) from AC charging stand 4 and DC charging stand 5 to vehicles 2A, 2B. Charging stand management server 6 also manages an amount of electric power discharged (amount of charging power) from vehicles 2A, 2B to AC charging stand 4 and DC charging stand 5.

AC charging stand 4 is a charging facility for supplying AC power to vehicle 2A via charging cable 44. In AC charging, a charging connector (not shown) provided at the tip of charging cable 44 is connected to vehicle 2A (AC inlet 31, which will be described below).

DC charging stand 5 is a charging facility for supplying DC power to vehicle 2B via a charging cable 58. In DC charging, a charging connector (not shown) provided at the tip of charging cable 58 is connected to vehicle 2B (DC inlet 38, which will be described below).

Vehicle management server 3 is a server that manages vehicles 2A, 2B. Vehicle management server 3 is configured to communicate with each of charging stand management server 6 and EMS server 7. Vehicle management server 3 is also configured to communicate with each of vehicles 2A, 2B. Vehicle management server 3 manages, for example, a charging state of a battery 20 (FIG. 2) mounted on each of vehicles 2A, 2B Vehicle management server 3 manages an amount of electric power supplied (amount of charging power) from AC charging stand 4 and DC charging stand 5 to vehicles 2A, 2B. Vehicle management server 3 manages an amount of electric power discharged (amount of charging power) from vehicles 2A, 2B to AC charging stand 4 and DC charging stand 5.

Vehicle management server 3 and charging stand management server 6 are provided separately in Embodiment 1, but a server that functions as both of vehicle management server 3 and charging stand management server 6 may be provided. Vehicle management server 3 and charging stand management server 6 correspond to an example of the "server" according to the present disclosure.

Vehicles 2A, 2B are battery electric vehicles. In Embodiment 1, vehicle 2A and vehicle 2B are similar in configuration Vehicle 2A and vehicle 2B may be merely referred to as "vehicle 2" below when no particular distinction is made between them. The power adjustment resource includes two vehicles 2 in Embodiment 1, but it may include any number of vehicles 2. The power adjustment resource includes one AC charging stand 4 and one DC charging stand 5 in Embodiment 1, but it may include any number of AC charging stands 4 and any number of DC charging stands 5.

Vehicle 2 according to Embodiment 1 is configured to perform AC charging of charging on-board battery 20 (FIG. 2) with AC power supplied from AC charging stand 4. Vehicle 2 is configured to perform DC charging of charging on-board battery 20 (FIG. 2) with DC power supplied from DC charging stand 5. Vehicle 2 is configured to perform AC discharging of converting electric power of battery 20 into AC power and supplying the converted AC power to AC charging stand 4. Vehicle 2 is further configured to perform DC discharging of supplying electric power of battery 20 to DC charging stand 5. It suffices that vehicle 2 can perform at least one of AC charging, DC charging, AC discharging, and DC discharging. More specifically, it suffices that vehicle 2A electrically connected to AC charging stand 4 is a vehicle that can perform at least one of AC charging and AC discharging. It suffices that vehicle 2B electrically connected to DC charging stand 5 is a vehicle that can perform at least one of DC charging and DC discharging. Vehicle 2 is not limited to a battery electric vehicle and may be, for example, a plug-in hybrid electric vehicle or a fuel cell electric vehicle.

AC charging stand 4 includes a controller 41, a communication device 42, a relay circuit 43, and a charging cable 44.

Communication device 42 is configured to perform bidirectional communication with charging stand management server 6. Communication device 42 includes a communication module conforming to, for example, a communication standard such as a wideband code division multiple access (W-CDMA) or a long term evolution (LTE), or a wireless local area network (LAN) standard such as institute of electrical and electronic engineers (IEEE) 802.11. Communication device 42 is also configured to perform bidirectional communication with a communication device 29A (FIG. 2) of vehicle 2A electrically connected via charging cable 44. Communication between communication device 42 and vehicle 2 (communication device 29) may be, for example, controller area network (CAN) communication complying with the CAN communication protocol, or power line communication (PLC). Alternatively, communication between communication device 42 and vehicle 2 (communication device 29) may be wireless communication.

Controller 41 includes a central processing unit (CPU), a memory (a read only memory (ROM) and a random access memory (RAM)), and an I/O port that receives and outputs various signals. Controller 41 receives a signal from each sensor, outputs a control signal to each device, and controls each device. Such control is not limited to processing by software and can be processed through construction by dedicated hardware (electronic circuit).

Relay circuit 43 is provided between a power line L1 electrically connected to power distribution system 10 and a power line L2 electrically connected to charging cable 44. Relay circuit 43 switches between a close state and an open state according to a command from controller 41. Controller 41 controls relay circuit 43 according to a command from vehicle 2. When relay circuit 43 is brought to the close state, electric power from power distribution system 10 is supplied to vehicle 2 (AC charging), or electric power from vehicle 2 is supplied to power distribution system 10 (AC discharging).

DC charging stand 5 includes a controller 51, a communication device 52, a charger 53, voltage sensors 54, 55, current sensors 56, 57, and charging cable 58.

Communication device 52 is configured to perform bidirectional communication with charging stand management server 6. Communication device 52 includes a communication module conforming to, for example, a communication standard such as W-CDMA or LTE, or a wireless LAN standard such as IEEE 802.11. Communication device 52 is configured to perform bidirectional communication with a communication device 29B (FIG. 2) of vehicle 2B electrically connected via charging cable 58. Communication between communication device 52 and vehicle 2 (communication device 29) may be, for example, CAN communication or power line communication. Alternatively, communication between communication device 52 and vehicle 2 (communication device 29) may be wireless communication.

Charger 53 is provided between a power line L3 electrically connected to power distribution system 10 and a power line L4 electrically connected to charging cable 58. Charger 53 converts AC power supplied from power distribution system 10 of microgrid MG into DC power to be supplied to vehicle 2B, in accordance with a command from controller 51. The DC power subjected to power conversion by charger 53 is supplied to vehicle 2B via charging cable 58. This DC power is used to charge battery 20 of vehicle 2B.

Charger 53 also converts the DC power supplied from vehicle 2B via charging cable 58 into AC power in accordance with a command from controller 51. The AC power subjected to power conversion by charger 53 is supplied to power distribution system 10.

Voltage sensor 54 detects a voltage Vd1 applied to power line L3 and outputs a signal indicating a detection result to controller 51.

Voltage sensor 55 detects a voltage Vd2 applied to power line L4 and outputs a signal indicating a detection result to controller 51.

Current sensor 56 detects a current Id1 flowing through power line L3 and outputs a signal indicating a detection result to controller 51.

Current sensor 57 detects a current Id2 flowing through power line L4 and outputs a signal indicating a detection result to controller 51.

In DC charging, voltage Vd1 is a voltage of electric power (electric power supplied from power distribution system 10 to DC charging stand 5) before power conversion by charger 53. Current Id1 is a current of electric power before power conversion by charger 53. Voltage Vd2 is a voltage of electric power after power conversion by charger 53. Current Id2 is a current of electric power after power conversion by charger 53.

In DC discharging, voltage Vd2 is a voltage of electric power (electric power supplied from vehicle 2 to DC charging stand 5) before power conversion by charger 53. Current Id2 is a current of electric power before power conversion by charger 53. Voltage Vd1 is a voltage of electric power after power conversion by charger 53. Current Id1 is a current of electric power after power conversion by charger 53.

Controller 51 includes a CPU, a memory (a ROM and a RAM), and an I/O port that receives and outputs various signals, each of which is not shown. Controller 51 receives a signal from each sensor, outputs a control signal to each device, and controls each device. Such control is not limited to processing by software and can be processed through construction by dedicated hardware (electronic circuit).

Controller 51 controls charger 53 to output electric power corresponding to a request from vehicle 2 in DC charging. Controller 51 also controls charger 53 to output electric power corresponding to a state (a system voltage and/or a system current) of power distribution system 10 in DC discharging.

Figure 2:
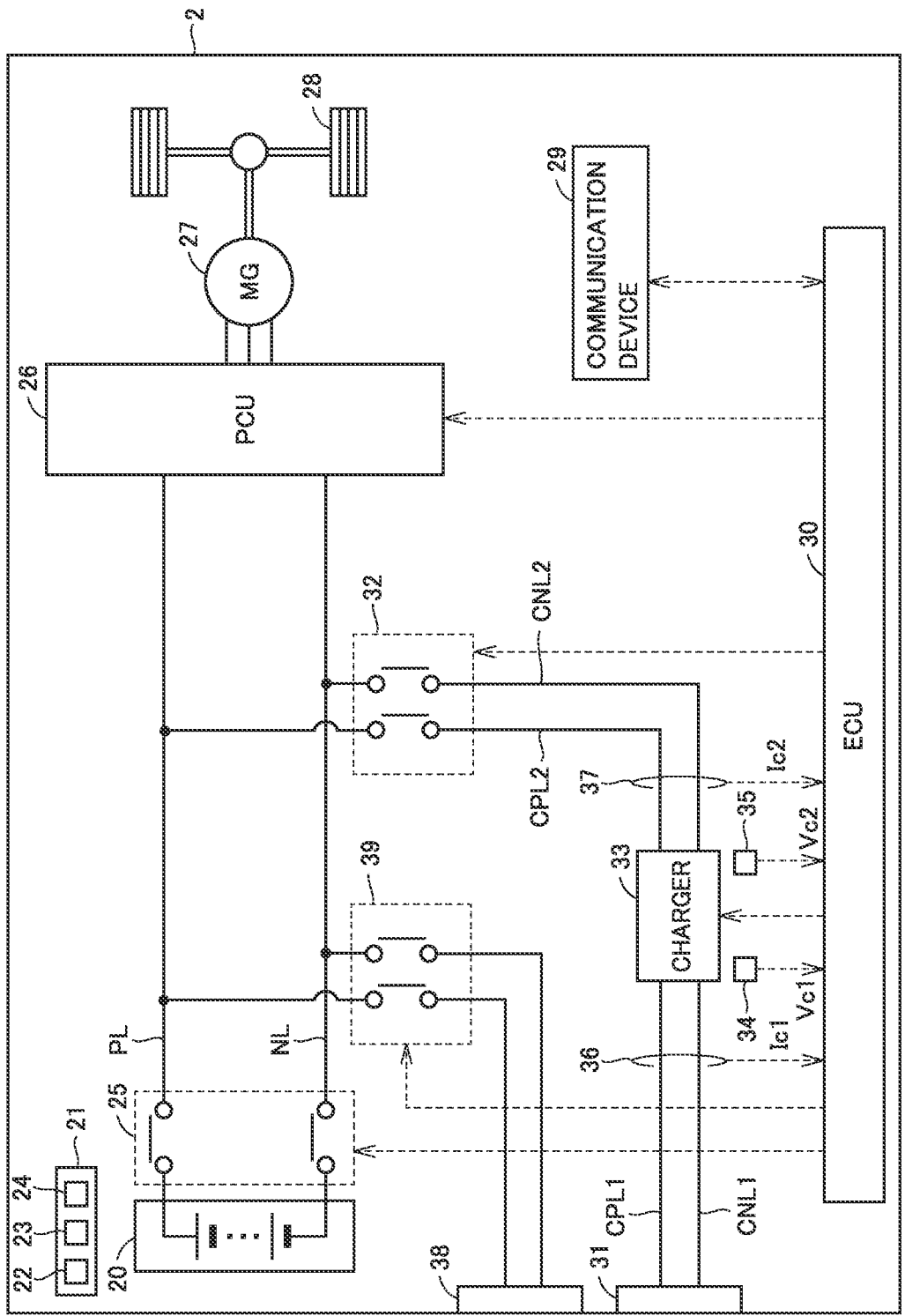
FIG. 2 shows a schematic configuration of a vehicle.

FIG. 2 shows a schematic configuration of vehicle 2. Vehicle 2 includes a battery 20, a monitoring unit 21, a system main relay (hereinafter also referred to as "SMR") 25, a power control unit (hereinafter also referred to as "PCU") 26, a motor generator 27, driving wheels 28, a communication device 29, and an electronic control unit (ECU) 30.

Battery 20 is mounted on vehicle 2 as a driving source (i.e., power source) of vehicle 2. Battery 20 includes a stack of a plurality of cells. The cell is, for example, a secondary cell such as a nickel metal-hydride cell or a lithium ion cell. The cell may be a cell having a liquid electrolyte between a positive electrode and a negative electrode, or may be a cell having a solid electrolyte (all-solid-state cell).

Monitoring unit 21 monitors the state of battery 20. Monitoring unit 21 includes a voltage sensor 22, a current sensor 23, and a temperature sensor 24. Voltage sensor 22 detects a voltage (battery voltage) VB of battery 20 and outputs a signal indicating a detection result to ECU 30. Current sensor 23 detects a current (battery current) IB input to and output from battery 20 and outputs a signal indicating a detection result to ECU 30. Temperature sensor 24 detects a temperature (battery temperature) TB of battery 20 and outputs a signal indicating a detection result to ECU 30.

SMR 25 is electrically connected to power lines PL, NL connecting PCU 26 to battery 20. When SMR 25 is in the close state, electric power is supplied from battery 20 to PCU 26. When SMR 25 is in the open state, electric power is not supplied from battery 20 to PCU 26. SMR 25 switches between the close state and the open state in accordance with a control signal from ECU 30.

PCU 26 converts DC power stored in battery 20 into AC power and supplies the AC power to motor generator 27, in accordance with a control signal from ECU 30. PCU 26 also converts AC power generated by motor generator 27 into DC power and supplies the DC power to battery 20. PCU 26 includes, for example, an inverter and a converter that boosts a DC voltage supplied to the inverter to embed more than or equal to an output voltage of battery 20.

Motor generator 27 is a three-phase AC synchronous electric motor including a rotor with an embedded permanent magnet. Motor generator 27 is driven by PCU 26 to generate a rotational driving force. The driving force generated by motor generator 27 is transmitted to driving wheels 28 via a transmission gear.

Communication device 29 is configured to perform bidirectional communication with vehicle management server 3. Communication device 29 includes a communication module conforming to, for example, a communication standard such as W-CDMA or LTE, or a wireless LAN standard such as IEEE 802.11. Communication device 29 is configured to perform bidirectional communication with communication device 42 (FIG. 1) of AC charging stand 4. Communication between communication device 29 and AC charging stand 4 (communication device 42) may be, for example, CAN communication complying with the CAN communication protocol or power line communication. Alternatively, communication between communication device 29 and AC charging stand 4 (communication device 42) may be wireless communication. Further, communication device 29 is configured to perform bidirectional communication with communication device 52 (FIG. 1) of DC charging stand 5. Communication between communication device 29 and DC charging stand 5 (communication device 52) may be, for example, CAN communication or power line communication. Communication between communication device 29 and DC charging stand 5 (communication device 52) may be wireless communication.

ECU 30 includes a CPU, a memory (a ROM and a RAM), and an I/O port that receives and outputs various signals, each of which is not shown. ECU 30 receives a signal from each sensor and outputs a control signal to each device, and controls each device. Such control is not limited to processing by software and can be processed through construction by dedicated hardware (electronic circuit).

ECU 30 is configured to calculate a state of charge (SOC) of battery 20. A method of calculating the SOC may be, for example, various known techniques such as a technique using integration of current values (Coulomb count) or a technique based on estimation of an open circuit voltage (OCV).

Vehicle 2 further includes an AC inlet 31, an AC charging relay 32, a charger 33, voltage sensors 34, 35, and current sensors 36, 37 as components for AC charging and AC discharging.

AC inlet 31 is connectable with the charging connector (not shown) provided at the tip of charging cable 44 of AC charging stand 4. When AC charging or AC discharging is not performed, AC inlet 31 is covered with an AC charging lid (not shown). When AC charging or AC discharging is performed, the AC charging lid is opened, and the charging connector of charging cable 44 is connected to AC inlet 31. During AC charging, AC inlet 31 receives AC power supplied from AC charging stand 4. During AC discharging, AC inlet 31 receives AC power supplied from charger 33.

AC charging relay 32 is a relay for electrical connection/disconnection between battery 20 and AC inlet 31. AC charging relay 32 is electrically connected between AC inlet 31 and power lines PL, NL connecting SMR 25 to PCU 26. AC charging relay 32 switches between the close state and the open state in accordance with a control signal from ECU 30.

Charger 33 is electrically connected between AC inlet 31 and AC charging relay 32. AC inlet 31 is electrically connected to charger 33 by power lines CPL1, CNL1. AC charging relay 32 is electrically connected to charger 33 by power lines CPL2, CNL2. Charger 33 converts AC power input from AC charging stand 4 to AC inlet 31 into DC power with a voltage corresponding to a voltage VB of battery 20, in accordance with a command from ECU 30. The DC power subjected to power conversion by charger 33 is supplied to battery 20 via AC charging relay 32 and SMR 25, so that battery 20 is charged (AC charging). Charger 33 also converts electric power of battery 20 into AC power in accordance with a command from ECU 30. The AC power converted by charger 33 is supplied to AC charging stand 4 via AC inlet 31.

Voltage sensor 34 detects a voltage Vc1 between power lines CPL1, CNL1 and outputs a signal indicating a detection result to ECU 30.

Voltage sensor 35 detects a voltage Vc2 between power lines CPL2, CNL2 and outputs a signal indicating a detection result to ECU 30.

Current sensor 36 detects a current Ic1 flowing through power lines CPL1, CNL1 and outputs a signal indicating a detection result to ECU 30.

Current sensor 37 detects a current Ic2 flowing through power lines CPL2, CNL2 and outputs a signal indicating a detection result to ECU 30.

Vehicle 2 further includes DC inlet 38 and a DC charging relay 39 as components for DC charging and DC discharging.

DC inlet 38 is connectable with the charging connector (not shown) provided at the tip of charging cable 58 of DC charging stand 5. When DC charging or DC discharging is not performed, DC inlet 38 is covered with a DC charging lid (not shown). When DC charging or DC discharging is performed, the DC charging lid is opened, and the charging connector of charging cable 58 is connected to DC inlet 38. During DC charging, DC inlet 38 receives DC power supplied from DC charging stand 5. During DC discharging, DC inlet 38 receives DC power supplied from battery 20.

DC charging relay 39 is a relay for electrical connection/disconnection between battery 20 and DC inlet 38. DC charging relay 39 is electrically connected between power lines PL, NL and DC inlet 38. DC charging relay 39 switches between the close state and the open state in accordance with a control signal from ECU 30.

Referring to FIGS. 1 and 2, in order to properly adjust supply and demand of power grid PG and microgrid MG, the amount of charging power supplied from power distribution system 10 to vehicle 2 and the amount of discharging power supplied from vehicle 2 to power distribution system 10 need to be calculated accurately.

In one conceivable configuration, vehicle 2 measures charging power and discharging power to calculate an amount of charging power and an amount of discharging power In another conceivable configuration, the charging stand (AC charging stand 4 and DC charging stand 5) measures charging power and discharging power to calculate an amount of charging power and an amount of discharging power. However, power conversion performed by charger 33, 53 is accompanied by a power conversion loss. Thus, when both of the measurement of electric power before power conversion and the measurement of electric power after power conversion are performed, an amount of charging power and an amount of discharging power cannot be measured accurately.

In Embodiment 1, thus, vehicle 2 measures charging power and discharging power when AC charging and AC discharging are performed, and DC charging stand 5 measures charging power and discharging power when DC charging and DC discharging are performed.

In AC charging, ECU 30 of vehicle 2 measures charging power using a detection value (voltage Vc1) of voltage sensor 34 and a detection value (current Ic1) of current sensor 36. Electric power before power conversion in charger 33 is measured, and accordingly, the measured electric power includes no loss amount of power conversion. ECU 30 of vehicle 2 then integrates the charging power measured during AC charging to calculate an amount of charging power in AC charging. This enables accurate measurement of an amount of charging power supplied from power distribution system 10. For example, electric power before power conversion by charger 33 of vehicle 2 can be measured by a voltage sensor and a current sensor provided to AC charging stand 4, but in this case, an additional cost and an additional mon-hour are required to provide the voltage sensor and the current sensor. As voltage sensor 34 and current sensor 36 provided together with charger 33 can be utilized to accurately calculate an amount of charging power without an additional cost and an additional man-hour. When it is desired to take the amount of electric power actually supplied to battery 20 as the amount of charging power, charging power can be measured using a detection value (voltage Vc2) of voltage sensor 35 and a detection value (current Ic2) of current sensor 37, and the integrated value thereof can be calculated as the amount of charging power.

In AC discharging, ECU 30 of vehicle 2 measures discharging power using the detection value (voltage Vc2) of voltage sensor 35 and the detection value (current Ic2) of current sensor 37. An amount of electric power before power conversion in charger 33 is measured, and accordingly, the measured electric power includes no loss amount of power conversion. ECU 30 of vehicle 2 then integrates the discharging power measured during AC discharging to calculate an amount of discharging power in AC discharging. This enables accurate measurement of an amount of discharging power supplied from battery 20. When it is desired to take the amount of electric power actually supplied to power distribution system 10 as the amount of discharging power, ECU 30 of vehicle 2 can measure discharging power using the detection value (voltage Vc1) of voltage sensor 34 and the detection value (current Ic1) of current sensor 36, and the integrated value thereof can be calculated as the amount of discharging power.

ECU 30 of vehicle 2 transmits the calculated amount of charging power and/or the calculated amount of discharging power to vehicle management server 3 via communication device 29. Vehicle management server 3 transmits the received amount of charging power and/or the received amount of discharging power to charging stand management server 6. Thus, the amount of charging power in AC charging and/or the amount of discharging power in AC discharging is shared with charging stand management server 6. Vehicle management server 3 also transmits the amount of charging power and/or the amount of discharging power to EMS server 7. This allows EMS server 7 to appropriately manage the supply and demand state of microgrid MG.

In DC charging, controller 51 of DC charging stand 5 measures charging power using a detection value (voltage Vd1) of voltage sensor 54 and a detection value (current Id1) of current sensor 56. Electric power before power conversion in charger 53 is measured, and accordingly, the measured charging power includes no loss amount of power conversion. Controller 51 of DC charging stand 5 then integrates charging power measured during DC charging to calculate an amount of charging power in DC charging. This enables accurate calculation of the amount of charging power supplied from power distribution system 10. When it is desired to take the amount of electric power actually supplied to battery 20 as the amount of charging power, charging power can be measured using a detection value (voltage Vd2) of voltage sensor 55 and a detection value (current Id2) of current sensor 57, and the integration value thereof can be calculated as the amount of charging power.

In DC discharging, controller 51 of DC charging stand 5 measures discharging power using the detection value (voltage Vd2) of voltage sensor 55 and the detection value (current Id2) of current sensor 57. An amount of electric power before power conversion in charger 53 is measured, and accordingly, the measured electric power includes no loss amount of power conversion. Controller 51 of DC charging stand 5 then integrates the discharging power measured during DC discharging to calculate an amount of discharging power in DC discharging. This enables accurate calculation of the amount of discharging power supplied from battery 20. When it is desired to take an amount of electric power actually supplied to power distribution system 10 as the amount of discharging power, controller 51 of DC charging stand 5 can measure discharging power using the detection value (voltage Vd1) of voltage sensor 54 and the detection value (current Id1) of current sensor 56 to calculate the integration value thereof as the amount of discharging power.

Controller 51 of DC charging stand 5 transmits the calculated amount of charging power and/or the calculated amount of discharging power to charging stand management server 6 via communication device 52. Charging stand management server 6 transmits the received amount of charging power and/or the received amount of discharging power to vehicle management server 3. Thus, the amount of charging power in DC charging and/or the amount of discharging power in DC discharging is shared with vehicle management server 3. Charging stand management server 6 also transmits the amount of charging power and/or the amount of discharging power to EMS server 7. This allows EMS server 7 to appropriately manage the supply and demand state of microgrid MG.

<Flowchart>
<<AC Charging>>

Figure 3:
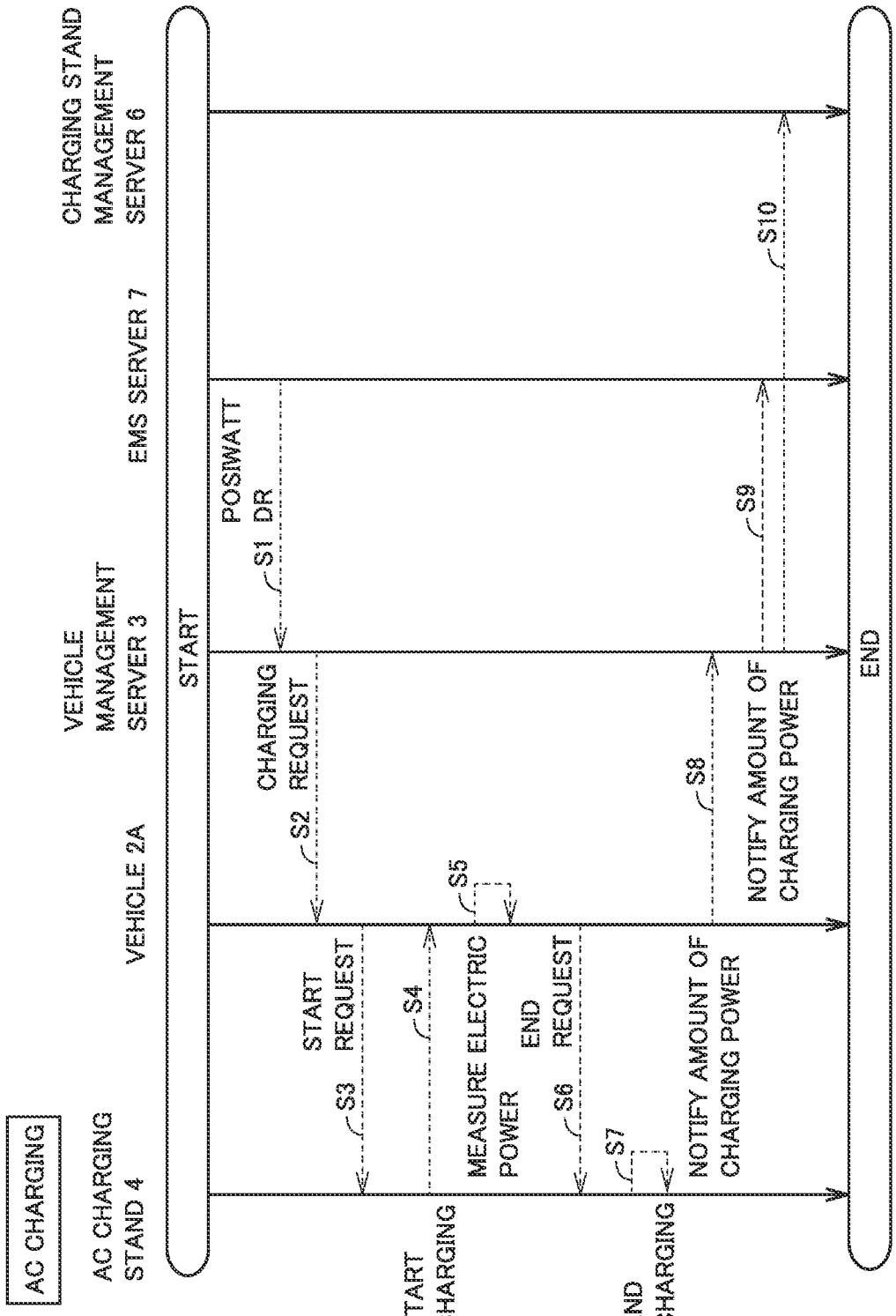
FIG. 3 is a flowchart showing a procedure of a process performed in AC charging.

FIG. 3 is a flowchart showing the procedure of a process performed in AC charging. The process of this flowchart starts, for example, when a condition for performing posiwatt DR (a request for increasing electric power demand) is satisfied. Description will be given of the case where each step (a step is abbreviated as "S" below) of the flowcharts shown in FIG. 3, and FIGS. 4, 11, and 12 described below is implemented through software processing by an ECU 30A of vehicle 2A, controller 41 of AC charging stand 4, vehicle management server 3, charging stand management server 6, and EMS server 7, but it may be partially or entirely implemented by hardware (electric circuit) formed in ECU 30A, in controller 41, in vehicle management server 3, in charging stand management server 6, and/or in EMS server 7.

At S1, EMS server 7 performs posiwatt DR to vehicle management server 3 in response to a request for adjusting supply and demand (increasing electric power demand) of power grid PG from power transmission and distribution utility server 8.

At S2, vehicle management server 3 transmits a charging request to vehicle 2A in response to posiwatt DR.

At S3, the user of vehicle 2A accepts a response to posiwatt DR and connects the charging connector of charging cable 44 of AC charging stand 4 to AC inlet 31. The user of vehicle 2A then performs a charging start operation. The charging start operation may be, for example, the operation of pressing a charging start button (not shown) displayed on an HMI device (not shown) of vehicle 2A with the charging connector of charging cable 44 connected to AC inlet 31. Upon detection that the charging start operation has been performed, ECU 30A of vehicle 2A outputs a request for starting AC charging to AC charging stand 4.

At S4, controller 41 of AC charging stand 4 starts supply of AC power to vehicle 2A in response to the start request. Thus, AC charging starts.

At S5, ECU 30A of vehicle 2A starts measurement of charging power supplied from AC charging stand 4 when AC charging starts. ECU 30A of vehicle 2A continuously measures charging power supplied from AC charging stand 4 during AC charging, that is, while charging power is being supplied from AC charging stand 4. ECU 30A of vehicle 2A measures charging power using the detection value (voltage Vc1) of voltage sensor 34 and the detection value (current Ic1) of current sensor 36.

At S6, when determining that the condition for ending AC charging is satisfied, ECU 30A of vehicle 2A outputs a request to end AC charging to AC charging stand 4. Examples of the condition for ending AC charging may include the condition that battery 20A has been fully charged, the condition that the SOC of battery 20A has reached the preset SOC, the condition that a preset charging time has elapsed, and the condition that a supply of power amount requested by a charging request has been received.

At S7, controller 41 of AC charging stand 4 ends supply of AC power to vehicle 2A in response to the end request. Thus, AC charging ends.

At S8, ECU 30A of vehicle 2A calculates an integrated value of charging power measured at S5 as the amount of charging power, and transmits the calculated amount of charging power to vehicle management server 3.

At S9, vehicle management server 3 transmits the amount of charging power received from vehicle 2A to EMS server 7.

At S10, vehicle management server 3 transmits the amount of charging power received from vehicle 2A to charging stand management server 6.

<<AC Discharging>>

Figure 4:
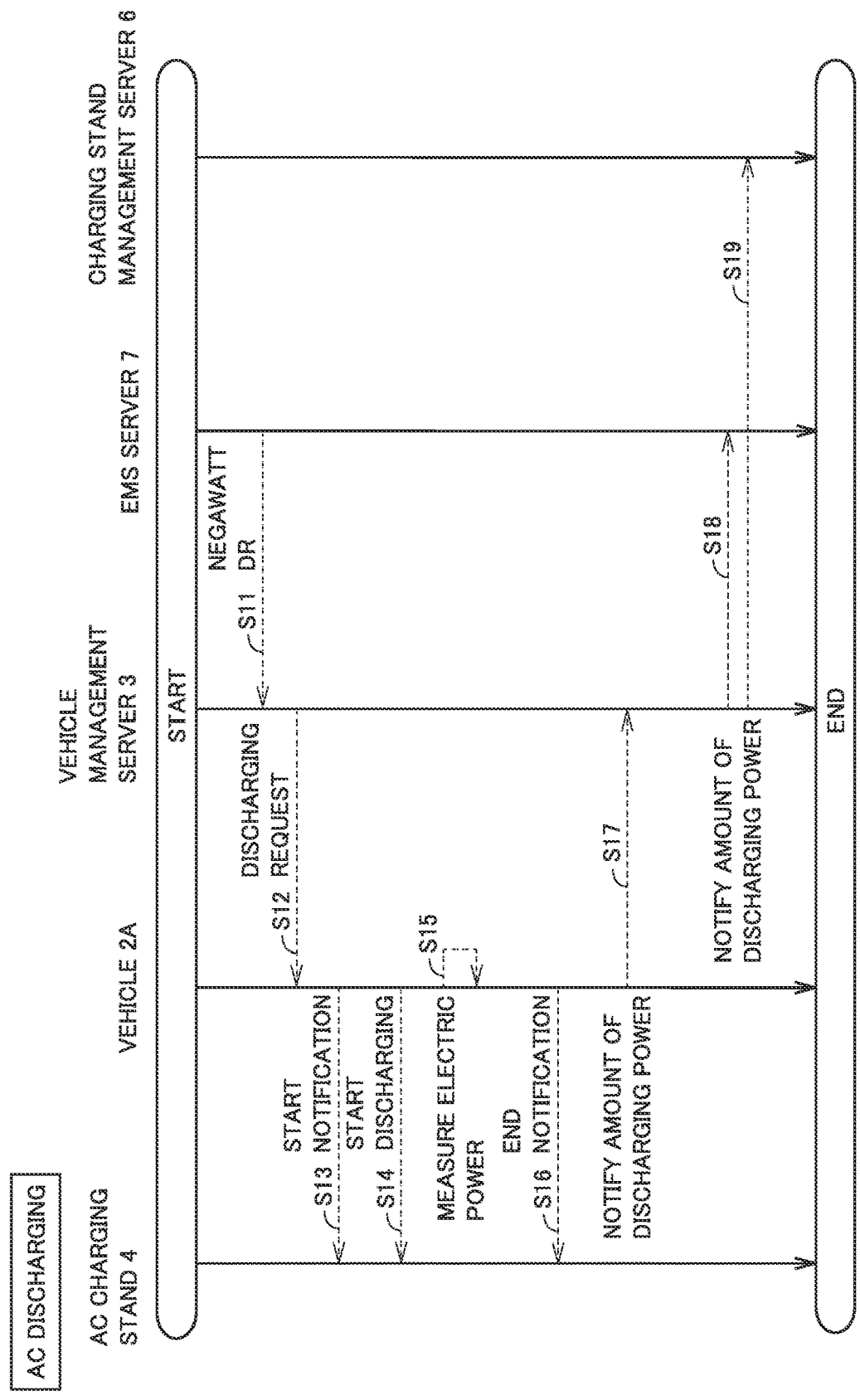
FIG. 4 is a flowchart showing a procedure of a process performed in AC discharging.

FIG. 4 is a flowchart showing the procedure of a process performed in AC discharging. The process of this flowchart starts when the condition for performing negawatt DR (a request for reducing an electric power demand) is satisfied.

At S11, EMS server 7 performs negawatt DR to vehicle management server 3 in response to the request for adjusting supply and demand (reducing an electric power demand) of power grid PG from power transmission and distribution utility server 8.

At S12, vehicle management server 3 transmits a discharging request to vehicle 2A in response to negawatt DR.

At S13, the user of vehicle 2A accepts a response to negawatt DR and connects the charging connector of charging cable 44 of AC charging stand 4 to AC inlet 31. The user of vehicle 2A then performs a discharging start operation. The discharging start operation may be, for example, the operation of pressing a discharge start button (not shown) displayed on the HMI device (not shown) of vehicle 2 with the charging connector of charging cable 44 connected to AC inlet 31. When detecting that the discharging start operation has been performed, ECU 30A of vehicle 2A outputs an AC discharging start notification to AC charging stand 4.

At S14, ECU 30A of vehicle 2A controls charger 33 to start discharging to AC charging stand 4.

At S15, ECU 30A of vehicle 2A starts measurement of discharging power supplied to AC charging stand 4 when AC discharging starts. ECU 30A of vehicle 2A continuously measures discharging power supplied to AC charging stand 4 during AC discharging, that is, while discharging power is being supplied to AC charging stand 4. ECU 30A of vehicle 2A measures discharging power using the detection value (voltage Vc2) of voltage sensor 35 and the detection value (current Ic2) of current sensor 37.

At S16, when determining that the condition for ending AC discharging is satisfied, ECU 30A of vehicle 2A stops supply of AC power to AC charging stand 4 and outputs an AC discharging end notification to AC charging stand 4. Examples of the condition for ending AC discharging may include the condition that the SOC of battery 20A has reached a lower-limit SOC or a preset SOC, the condition that a preset charging time has elapsed, and the condition that the amount of electric power requested by the discharging request has been supplied.

At S17, ECU 30A of vehicle 2A calculates the integrated value of the discharging power measured at S15 as the amount of discharging power and transmits the calculated amount of discharging power to vehicle management server 3.

At S18, vehicle management server 3 transmits the amount of discharging power received from vehicle 2A to EMS server 7.

At S19, vehicle management server 3 transmits the amount of discharging power received from vehicle 2A to charging stand management server 6.

<<DC Charging>>

Figure 5:
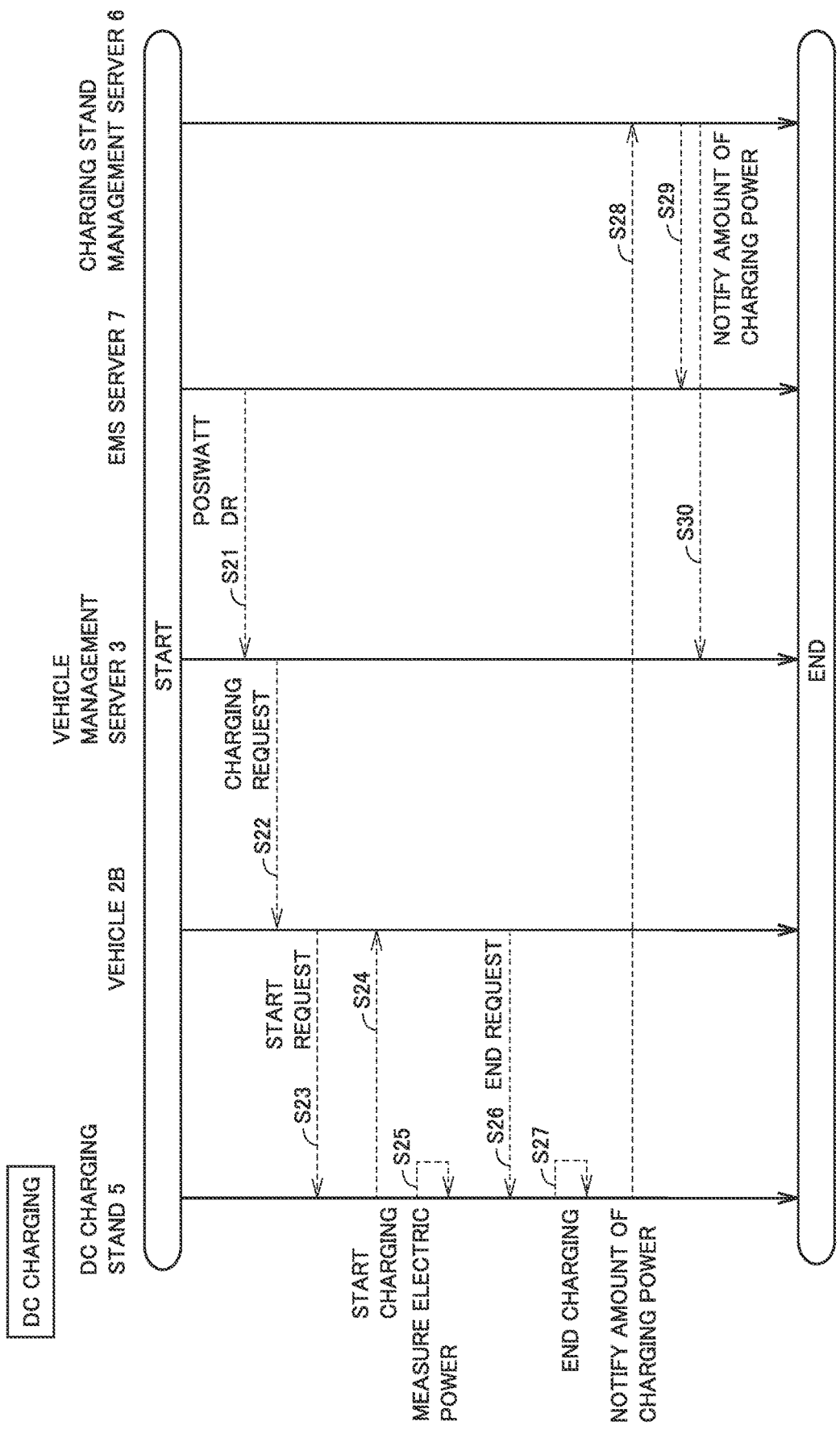
FIG. 5 is a flowchart showing a procedure of a process performed in DC charging.

FIG. 5 is a flowchart showing the procedure of a process performed in DC charging. The process of this flowchart starts, for example, when the condition for performing posiwatt DR is satisfied. Description will be given of the case where each step of the flowcharts shown in FIG. 5, and FIGS. 6, 8, and 9 described below is implemented through software processing by ECU 30B of vehicle 2B, controller 51 of DC charging stand 5, vehicle management server 3, charging stand management server 6, and EMS server 7, but it may be partially or entirely implemented by hardware (electric circuit) formed in ECU 30B, in controller 51, in vehicle management server 3, in charging stand management server 6, and/or in EMS server 7.

At S21, EMS server 7 performs posiwatt DR to vehicle management server 3 in response to a request for adjusting supply and demand (increasing electric power demand) of power grid PG from power transmission and distribution utility server 8.

At S22, vehicle management server 3 transmits a charging request to vehicle 2B in response to posiwatt DR.

At S23, the user of vehicle 2B accepts a response to posiwatt DR and connects the charging connector of charging cable 58 of DC charging stand 5 to DC inlet 38. The user of vehicle 2B then performs the charging start operation. When detecting that the charging start operation has been performed, ECU 30B of vehicle 2B outputs a request for starting DC charging to DC charging stand 5.

At S24, controller 51 of DC charging stand 5 starts supply of DC power to vehicle 2B in response to the start request. Thus, DC charging starts.

At S25, controller 51 of DC charging stand 5 starts measurement of charging power supplied to vehicle 2B when DC charging starts. Controller 51 of DC charging stand 5 continuously measures charging power supplied to vehicle 2B during DC charging, that is, while charging power is being supplied to vehicle 2B. Controller 51 of DC charging stand 5 measures charging power using the detection value (voltage Vd1) of voltage sensor 54 and the detection value (current Id1) of current sensor 56.

At S26, when determining that the condition for ending DC charging is satisfied, ECU 30B of vehicle 2B outputs a request for ending DC charging to DC charging stand 5. The condition for ending DC charging may be a condition similar to the condition for ending AC charging described above.

At S27, controller 51 of DC charging stand 5 ends supply of DC power to vehicle 2B in response to the end request. Thus, DC charging ends.

At S28, controller 51 of DC charging stand 5 calculates the integrated value of charging power measured at S25 as the amount of charging power, and transmits the calculated amount of charging power to charging stand management server 6.

At S29, charging stand management server 6 transmits the amount of charging power received from DC charging stand 5 to EMS server 7.

At S30, charging stand management server 6 transmits the amount of charging power received from DC charging stand 5 to vehicle management server 3.

<<DC Discharging>>

Figure 6:
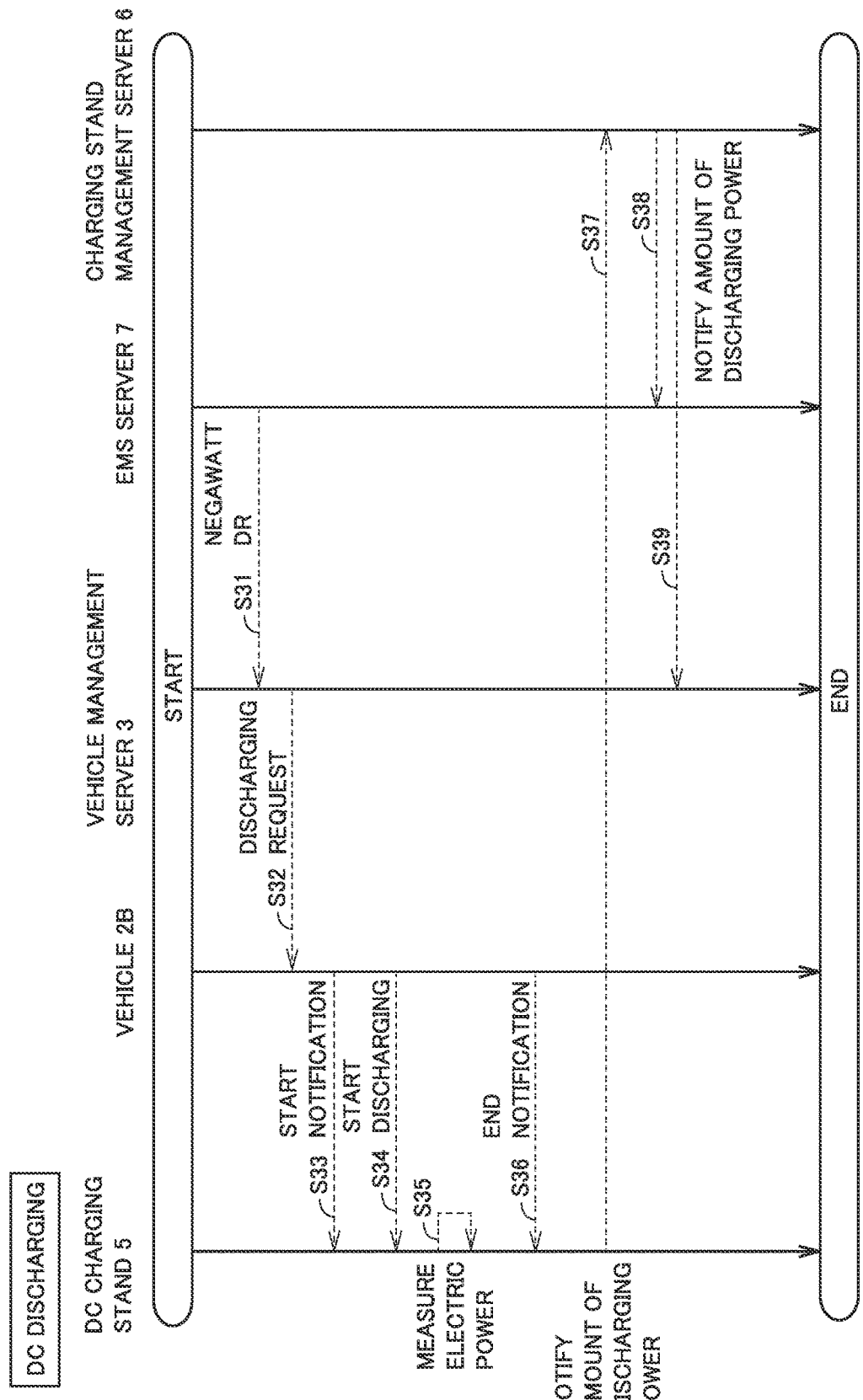
FIG. 6 is a flowchart showing a procedure of a process performed in DC discharging.

FIG. 6 is a flowchart showing the procedure of a process performed in DC discharging. The process of this flowchart starts, for example, when the condition for performing negawatt DR is satisfied.

At S31, EMS server 7 performs negawatt DR to vehicle management server 3 in response to a request for adjusting supply and demand (reducing an electric power demand) of power grid PG from power transmission and distribution utility server 8.

At S32, vehicle management server 3 transmits a discharging request to vehicle 2B in response to negawatt DR.

At S33, the user of vehicle 2B accepts a response to negawatt DR and connects the charging connector of charging cable 58 of DC charging stand 5 to DC inlet 38. The user of vehicle 2B then performs the discharging start operation. When detecting that the discharging start operation has been performed, ECU 30B of vehicle 2B outputs a DC discharging start notification to DC charging stand 5.

At S34, ECU 30B of vehicle 2B starts discharging to DC charging stand 5.

At S35, controller 51 of DC charging stand 5 controls charger 53 to convert DC power received from vehicle 2B into AC power and supplies the AC power to power distribution system 10. Controller 51 of DC charging stand 5 starts measurement of discharging power supplied to power distribution system 10 when DC discharging starts. Controller 51 of DC charging stand 5 continuously measures discharging power supplied to power distribution system 10 during DC discharging, that is, while discharging power is being supplied to power distribution system 10 (while supply of electric power is being received from vehicle 2B). Controller 51 of DC charging stand 5 measures discharging power using the detection value (voltage Vd2) of voltage sensor 55 and the detection value (current Id2) of current sensor 57.

At S36, when determining that the condition for ending DC discharging is satisfied, ECU 30B of vehicle 2B stops supply of discharging power to DC charging stand 5 and outputs a DC discharging end notification to DC charging stand 5. The condition for ending DC discharging may be a condition similar to the condition for ending AC discharging described above.

At S37, controller 51 of DC charging stand 5 calculates the integrated value of discharging power measured at S35 as the amount of discharging power and transmits the calculated amount of discharging power to charging stand management server 6.

At S38, charging stand management server 6 transmits the amount of discharging power received from vehicle 2B to EMS server 7.

At S39, charging stand management server 6 transmits the amount of discharging power received from vehicle 2B to vehicle management server 3.

In electric power system 1 according to Embodiment 1, vehicle 2 measures charging power and discharging power when AC charging and AC discharging are performed, and DC charging stand 5 measures charging power and discharging power when DC charging and DC discharging are performed, as described above. Thus, in all of AC charging, AC discharging, DC charging, and DC discharging, the amount of charging power or the amount of discharging power is calculated based on the electric power (charging power or discharging power) before power conversion in charger 33, 53. The calculated amount of charging power and the calculated amount of discharging power include no loss amount of power conversion. This enables accurate calculation of the amount of charging power and the amount of discharging power. In other words, the amount of charging power supplied from power distribution system 10 to vehicle 2 and the amount of discharging power supplied from vehicle 2 to power distribution system 10 can be measured accurately.

Moreover, voltage sensors 34, 35 and current sensors 36, 37 provided together with charger 33 and voltage sensors 54, 55 and current sensors 56, 57 provided together with charger 53 can be utilized to measure charging power and discharging power, thereby reducing an additional cost and an additional man-hour.

[Variation 1]

A communication failure may occur between DC charging stand 5 and charging stand management server 6. Also in such a case, it is desirable that the amount of charging power in DC charging and/or the amount of discharging power in DC discharging be output properly to various servers (vehicle management server 3, charging stand management server 6, and EMS server 7). The amount of charging power and the amount of discharging power calculated in DC charging stand 5 will also be collectively referred to as "first measured power amount" below.

Figure 7:
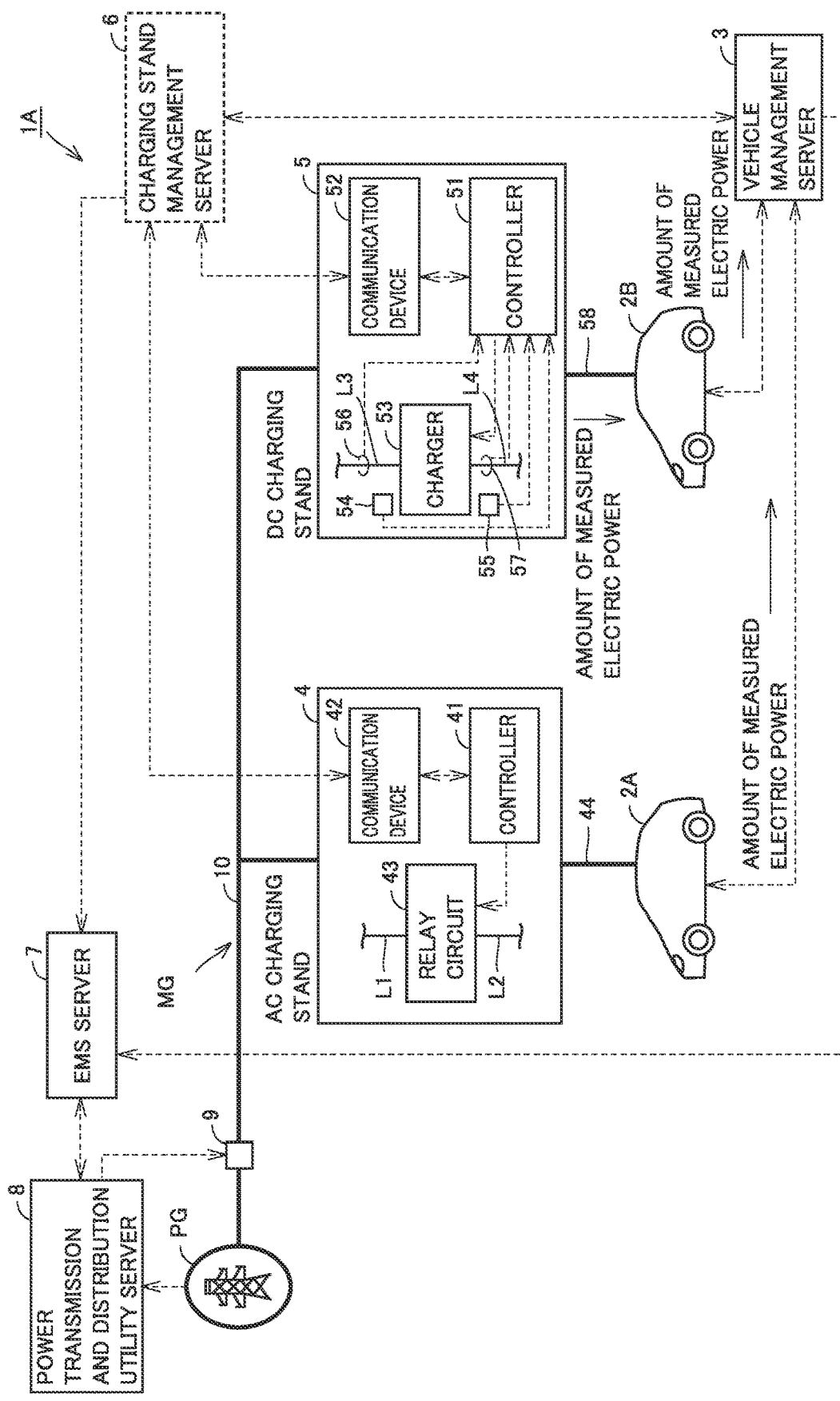
FIG. 7 shows a schematic configuration of an electric power system according to Variation 1.

FIG. 7 shows a schematic configuration of an electric power system 1A according to Variation 1. Electric power system 1A is different from electric power system 1 according to Embodiment 1 in the destination to which DC charging stand 5 transmits a first measured power amount.

When communication with charging stand management server 6 cannot be performed, controller 51 of DC charging stand 5 transmits the first measured power amount to vehicle 2B via communication device 52. Upon receipt of the first measured power amount from DC charging stand 5, ECU 30B of vehicle 2B transmits the first measured power amount to vehicle management server 3 via communication device 29B. Vehicle management server 3 then transmits the first measured power amount received from vehicle 2B to EMS server 7. EMS server 7 can thus recognize the amount of charging power in DC charging and/or the amount of discharging power in DC discharging.

Vehicle management server 3 transmits the first measured power amount received from vehicle 2B to charging stand management server 6. Charging stand management server 6 can thus recognize the amount of charging power in DC charging and/or the amount of discharging power in DC discharging.

The application of Variation 1 is not limited to the case in which communication between DC charging stand 5 and charging stand management server 6 cannot be performed. For example, DC charging stand 5 may be configured to always transmit the first measured power amount to vehicle 2B. Such a configuration can include no charging stand management server 6.

Figure 8:
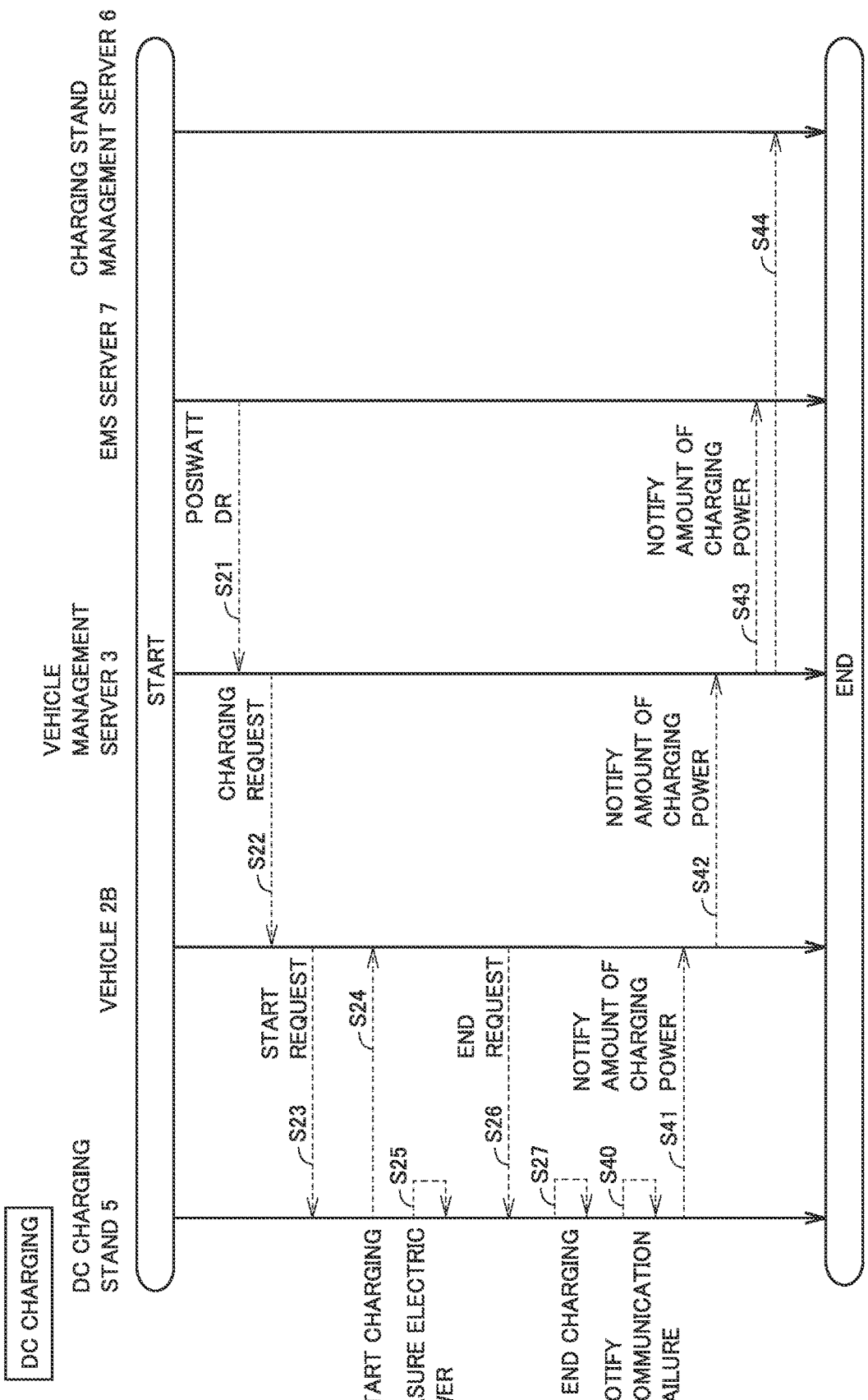
FIG. 8 is a flowchart showing a procedure of a process performed in DC charging in Variation 1.

FIG. 8 is a flowchart showing the procedure of a process performed in DC charging in Variation 1. The flowchart of FIG. 8 is obtained by deleting processing of S28 to processing of S30 from, and adding processing of S40 to processing of S44 to, the flowchart of FIG. 5. Any other processing of the flowchart of FIG. 8 is similar to processing of the flowchart of FIG. 5, and accordingly, is denoted by the same step number and will not be described repeatedly.

At S40, controller 51 of DC charging stand 5 detects that a communication failure has occurred between charging stand management server 6 and DC charging stand 5. When no communication failure is detected between charging stand management server 6 and DC charging stand 5 at S40, it suffices that processing of S28 to processing of S30 of FIG. 5 are performed.

At S41, controller 51 of DC charging stand 5 calculates the integrated value of charging power measured at S25 as the amount of charging power, and transmits the calculated amount of charging power to vehicle 2B.

At S42, ECU 30B of vehicle 2B transmits the amount of charging power received from DC charging stand 5 to vehicle management server 3.

At S43, vehicle management server 3 transmits the amount of charging power received from vehicle 2B to EMS server 7.

At S44, vehicle management server 3 transmits the amount of charging power received from vehicle 2B to charging stand management server 6.

Processing of S40 may be omitted, and controller 51 of DC charging stand 5 may always transmit the amount of charging power to vehicle 2B.

Figure 9:
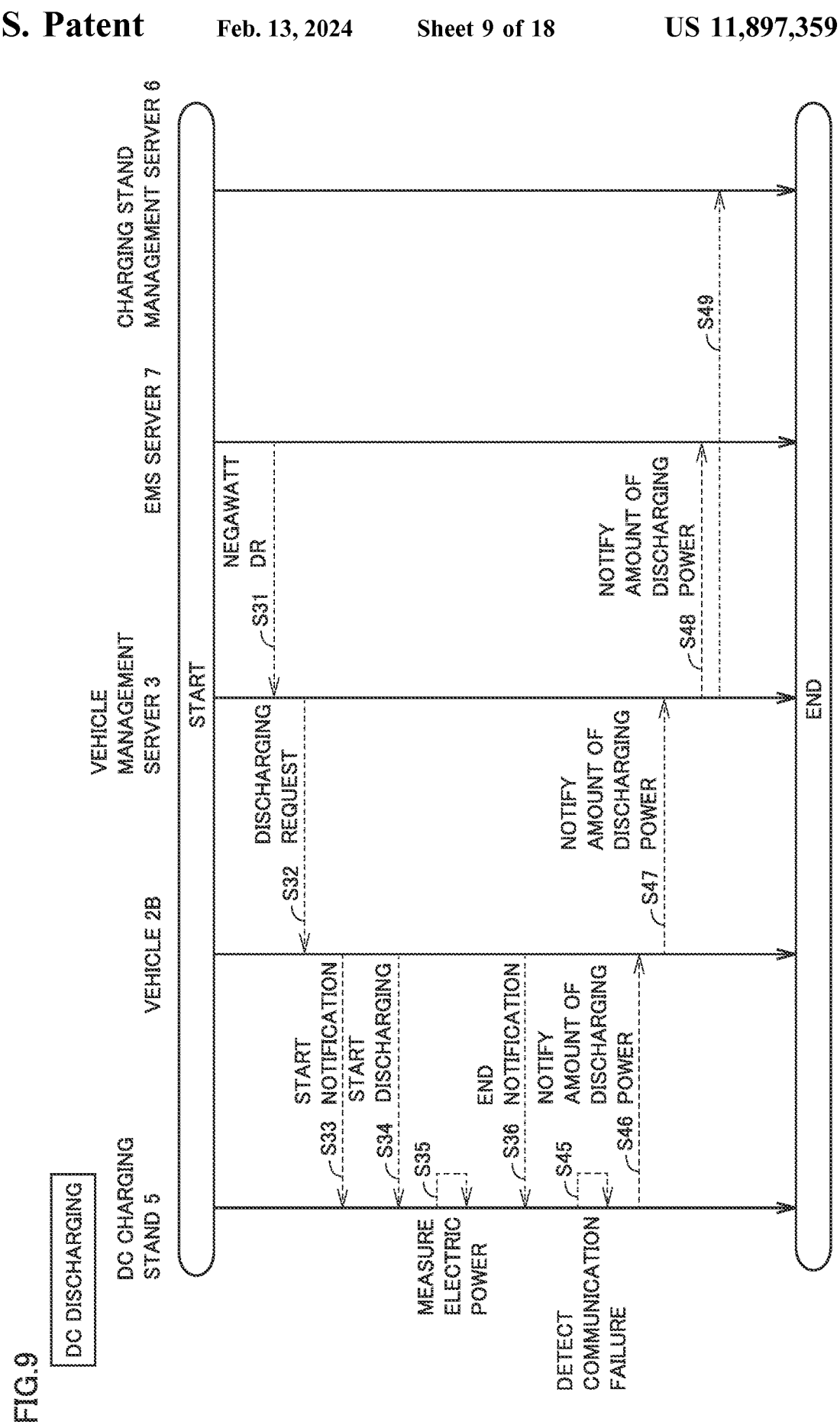
FIG. 9 is a flowchart showing a procedure of a process performed in DC discharging in Variation 1.

FIG. 9 is a flowchart showing the procedure of a process performed in DC discharging in Variation 1. The flowchart of FIG. 9 is obtained by deleting processing of S37 to processing of S39 from, and adding processing of S45 to processing of S49 to, the flowchart of FIG. 6. Any other processing of the flowchart of FIG. 9 is similar to processing of the flowchart of FIG. 6, and accordingly, is denoted by the same step number and will not be described repeatedly.

At S45, controller 51 of DC charging stand 5 detects that a communication failure has occurred between charging stand management server 6 and DC charging stand 5. When no communication failure is detected between charging stand management server 6 and DC charging stand 5 at S45, it suffices that processing of S37 to processing of S39 of FIG. 6 are performed.

At S46, controller 51 of DC charging stand 5 calculates the integrated value of discharging power measured at S35 as the amount of discharging power, and transmits the calculated amount of discharging power to vehicle 2B.

At S47, ECU 30B of vehicle 2B transmits the amount of discharging power received from DC charging stand 5 to vehicle management server 3.

At S48, vehicle management server 3 transmits the amount of discharging power received from vehicle 2B to EMS server 7.

At S49, vehicle management server 3 transmits the amount of discharging power received from vehicle 2B to charging stand management server 6.

Processing of S45 may be omitted, and controller 51 of DC charging stand 5 may always transmit the amount of discharging power to vehicle 2B.

Even when communication between DC charging stand 5 and charging stand management server 6 cannot be performed, in electric power system 1A according to Variation 1, the amount of charging power and/or the amount of discharging power can be transmitted to various servers (vehicle management server 3, charging stand management server 6, and EMS server 7) via vehicle 2B, as described above.

[Variation 2]

A communication failure may occur between vehicle 2A and vehicle management server 3. Also in such a case, it is desirable that the amount of charging power in AC charging and/or the amount of discharging power in AC discharging be output properly to various servers (vehicle management server 3, charging stand management server 6, and EMS server 7). The amount of charging power and the amount of discharging power calculated in vehicle 2A will also be collectively referred to as "second measured power amount" below.

Figure 10:
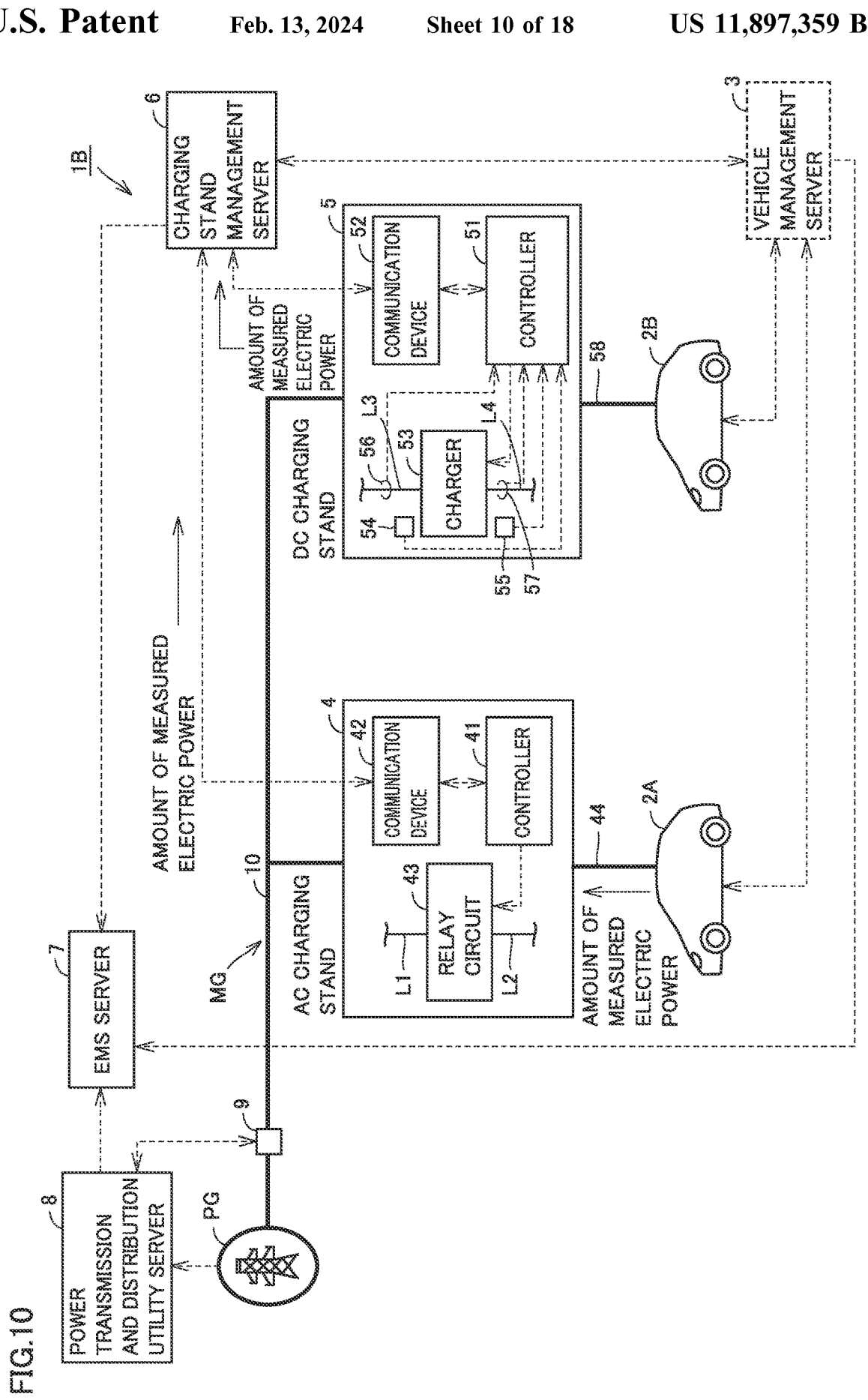
FIG. 10 shows a schematic configuration of an electric power system according to Variation 2.

FIG. 10 shows a schematic configuration of an electric power system 1B according to Variation 2. Electric power system 1B is different from electric power system 1 according to Embodiment 1 in the destination to which vehicle 2A transmits a second measured power amount.

When communication between vehicle 2A and vehicle management server 3 cannot be performed, ECU 30A of vehicle 2A transmits the second measured power amount to AC charging stand 4 via communication device 29A. Upon receipt of the second measured power amount from vehicle 2A, controller 41 of AC charging stand 4 transmits the second measured power amount to charging stand management server 6 via communication device 42. Charging stand management server 6 then transmits the second measured power amount received from AC charging stand 4 to EMS server 7. Thus, EMS server 7 can recognize the amount of charging power in AC charging and/or the amount of discharging power in AC discharging.

Charging stand management server 6 transmits the second measured power amount received from AC charging stand 4 to vehicle management server 3. Vehicle management server 3 can thus recognize the amount of charging power in AC charging and/or the amount of discharging power in AC discharging.

The application of Variation 2 is not limited to the case in which communication between vehicle 2A and vehicle management server 3 cannot be performed. For example, vehicle 2A may be configured to always transmit the second measured power amount to AC charging stand 4. Such a configuration can include no vehicle management server 3.

Figure 11:
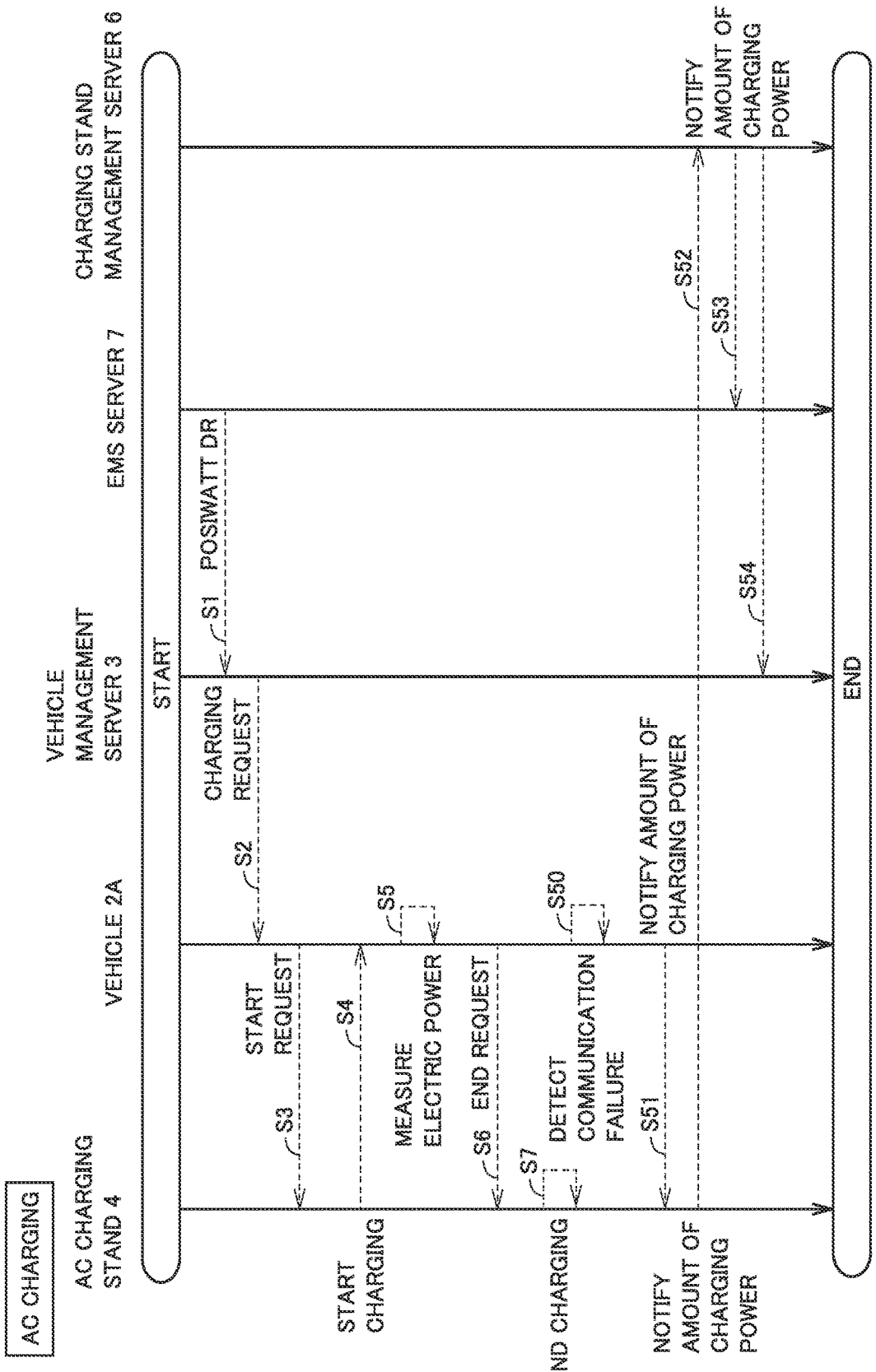
FIG. 11 is a flowchart showing a procedure of a process performed in AC charging in Variation 2.

FIG. 11 is a flowchart showing the procedure of a process performed in AC charging in Variation 2. The flowchart of FIG. 11 is obtained by deleting processing of S8 to processing of S10 from, and adding processing of S50 to processing of S54 to, the flowchart of FIG. 3. Any other processing of the flowchart of FIG. 11 is similar to processing of the flowchart of FIG. 3, and accordingly, is denoted by the same step number and will not be described repeatedly.

At S50, ECU 30A of vehicle 2A detects that a communication failure has occurred between vehicle management server 3 and vehicle 2A. When no communication failure is detected between vehicle management server 3 and vehicle 2A at S50, it suffices that processing of S8 to processing of S10 of FIG. 3 are performed.

At S51, ECU 30A of vehicle 2A calculates the integrated value of charging power measured at S5 as the amount of charging power, and transmits the calculated amount of charging power to AC charging stand 4.

At S52, controller 41 of AC charging stand 4 transmits the amount of charging power received from vehicle 2A to charging stand management server 6.

At S53, charging stand management server 6 transmits the amount of charging power received from AC charging stand 4 to EMS server 7.

At S54, charging stand management server 6 transmits the amount of charging power received from AC charging stand 4 to vehicle management server 3.

Processing of S50 may be omitted, and ECU 30A of vehicle 2A may always transmit the amount of charging power to AC charging stand 4.

Figure 12:
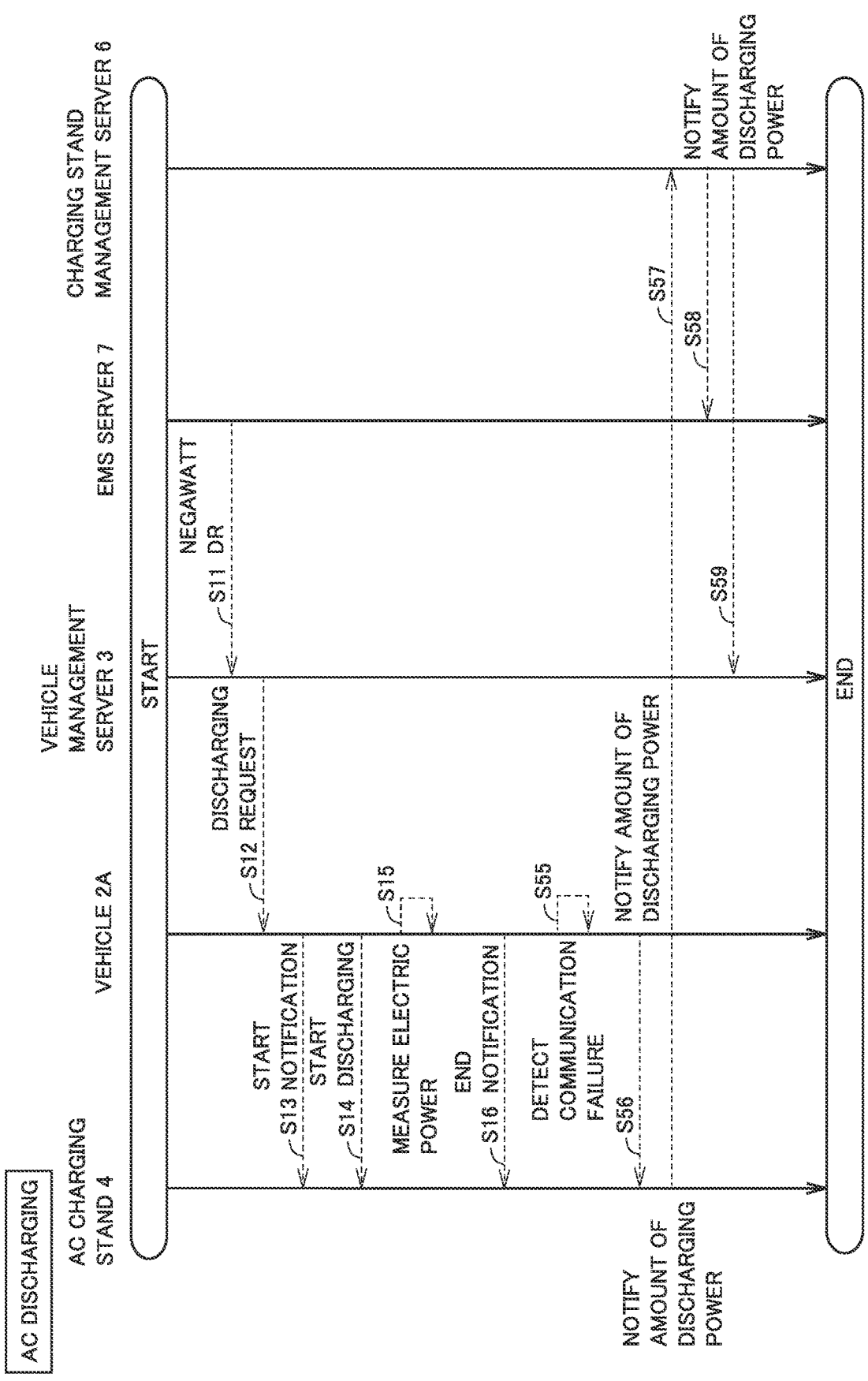
FIG. 12 is a flowchart showing a procedure of a process performed in AC discharging in Variation 2.

FIG. 12 is a flowchart showing the procedure of a process performed in AC discharging in Variation 2. The flowchart of FIG. 12 is obtained by deleting processing of S17 to processing of S19 from, and adding processing of S55 to processing of S59 to, the flowchart of FIG. 4. Any other processing of the flowchart of FIG. 12 is similar to processing of the flowchart of FIG. 4, and accordingly, is denoted by the same step number and will not be described repeatedly.

At S55, ECU 30A of vehicle 2A detects that a communication failure has occurred between vehicle management server 3 and vehicle 2A. When no communication failure is detected between vehicle management server 3 and vehicle 2A at S55, it suffices that processing of S17 to processing of S19 of FIG. 4 are performed.

At S56, ECU 30A of vehicle 2A calculates the integrated value of discharging power measured at S15 as the amount of discharging power, and transmits the calculated amount of discharging power to AC charging stand 4.

At S57, controller 41 of AC charging stand 4 transmits the amount of discharging power received from vehicle 2A to charging stand management server 6.

At S58, charging stand management server 6 transmits the amount of discharging power received from AC charging stand 4 to EMS server 7.

At S59, charging stand management server 6 transmits the amount of discharging power received from AC charging stand 4 to vehicle management server 3.

Processing of S55 may be omitted, and ECU 30A of vehicle 2A may always transmit the amount of discharging power to AC charging stand 4.

Even when communication between vehicle 2A and vehicle management server 3 cannot be performed, in electric power system 1B according to Variation 2, the amount of charging power and/or the amount of discharging power can be transmitted to various servers (vehicle management server 3, charging stand management server 6, and EMS server 7) via AC charging stand 4, as described above.

Embodiment 2

Figure 13:
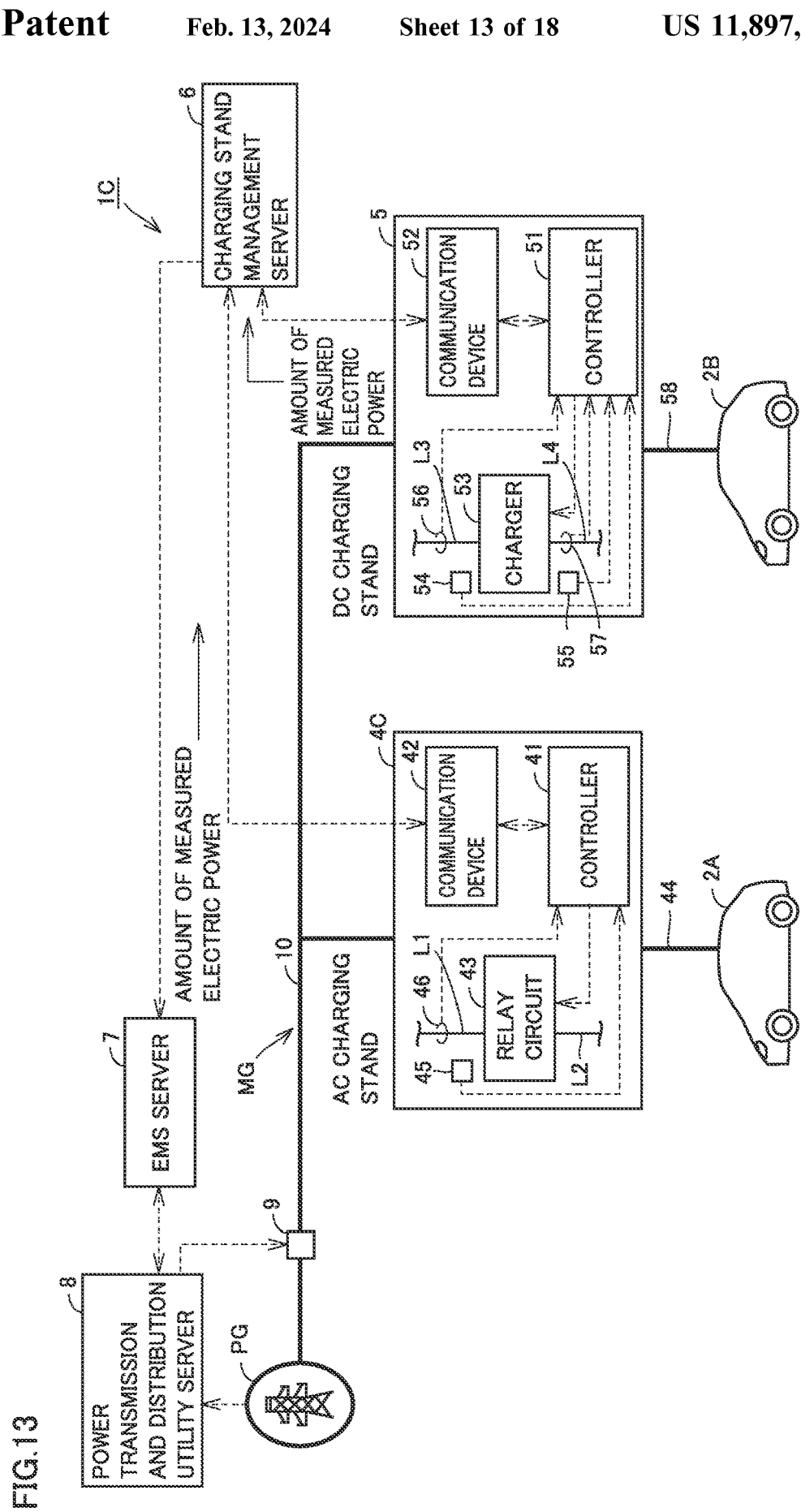
FIG. 13 shows a schematic configuration of an electric power system according to Embodiment 2.

FIG. 13 shows a schematic configuration of an electric power system 1C according to Embodiment 2. Electric power system 1C according to Embodiment 2 is obtained by deleting vehicle management server 3 from electric power system 1 according to Embodiment 1 and replacing AC charging stand 4 with an AC charging stand 4C. Other components of electric power system 1C are similar to the components of electric power system 1, and accordingly have the same reference characters allotted and will not be described repeatedly.

In electric power system 1C, the charging stand (AC charging stand 4 and DC charging stand 5) measures electric power and calculates an amount of charging power and an amount of discharging power in AC charging, AC discharging, DC charging, and DC discharging. The calculated amount of charging power and the calculated amount of discharging power are transmitted from the charging stand to charging stand management server 6, and further from charging stand management server 6 to EMS server 7. The processes performed in DC charging and DC discharging are similar to those of Embodiment 1, and accordingly will not be described repeatedly.

AC charging stand 4C is obtained by adding a voltage sensor 45 and a current sensor 46 to AC charging stand 4.

Voltage sensor 45 detects a voltage Vc3 applied to power line L1 and outputs a signal indicating a detection result to controller 41.

Current sensor 46 detects a current Ic3 flowing through power line L1 and outputs a signal indicating a detection result to controller 41.

In AC charging, controller 41 measures charging power using a detection value (voltage Vc3) of voltage sensor 45 and a detection value (current Ic3) of current sensor 46. Controller 41 integrates the charging power measured during AC charging to calculate an amount of charging power in AC charging. Since the electric power before power conversion in charger 33 of vehicle 2A is used to calculate an amount of charging power, the calculated amount of charging power includes no loss amount of power conversion. Thus, the amount of charging power supplied from power distribution system 10 can be calculated accurately.

In AC discharging, controller 41 measures discharging power using the detection value (voltage Vc3) of voltage sensor 45 and the detection value (current Ic3) of current sensor 46. Controller 41 integrates the discharging power measured during AC discharging to calculate an amount of discharging power in AC discharging. In this case, although the calculated amount of discharging power includes a loss amount of power conversion, an actual amount of discharging power supplied to power distribution system 10 can be calculated.

Controller 41 transmits the calculated amount of charging power and the calculated amount of discharging power to charging stand management server 6 via communication device 42. Charging stand management server 6 transmits the amount of charging power and the amount of discharging power to EMS server 7. This allows EMS server 7 to properly manage the state of supply and demand of microgrid MG.

Figure 14:
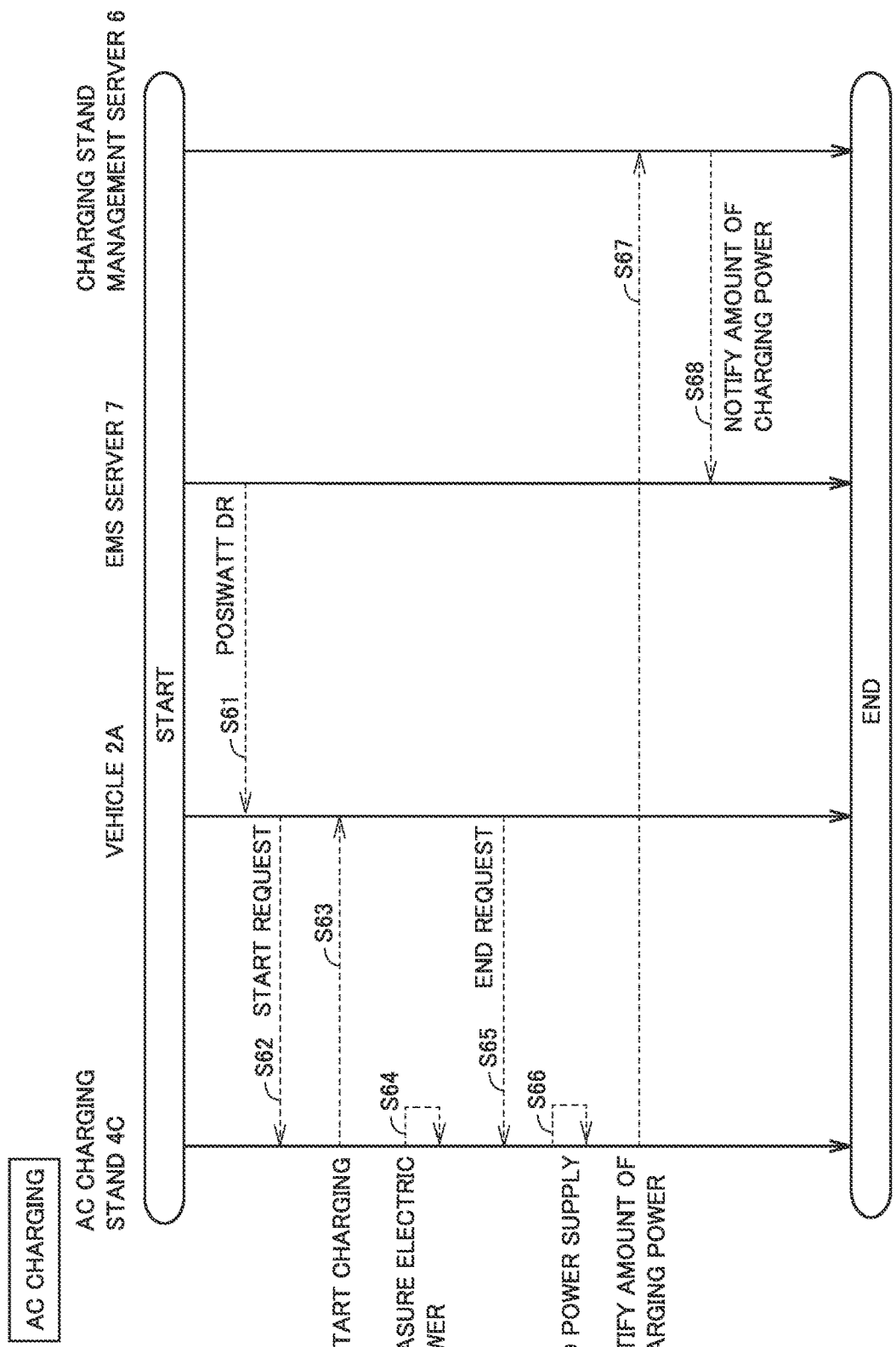
FIG. 14 is a flowchart showing a procedure of a process performed in AC charging in Embodiment 2.

FIG. 14 is a flowchart showing the procedure of a process performed in AC charging in Embodiment 2. The process of this flowchart starts, for example, when the condition for performing posiwatt DR (a request for increasing electrical power demand) is satisfied. In Embodiment 2, the request for increasing electric power demand is transmitted directly from EMS server 7 to vehicle 2A.

At S61, EMS server 7 requests posiwatt DR from vehicle 2A in response to a request for adjusting supply and demand (increasing electric power demand) of power grid PG from power transmission and distribution utility server 8.

At S62, the user of vehicle 2A accepts a response to posiwatt DR and connects the charging connector of charging cable 44 of AC charging stand 4C to AC inlet 31. The user of vehicle 2A then performs the charging start operation. When detecting that the charging start operation has been performed, ECU 30A of vehicle 2A outputs a request for starting AC charging to AC charging stand 4C.

At S63, controller 41 of AC charging stand 4C starts supply of AC power to vehicle 2A in response to the start request. Thus, AC charging starts.

At S64, controller 41 of AC charging stand 4C starts measurement of charging power supplied to vehicle 2A when AC charging starts. Controller 41 of AC charging stand 4C continuously measures charging power supplied to vehicle 2A during AC charging, that is, while charging power is being supplied to vehicle 2A.

At S65, when determining that a condition for ending AC charging is satisfied, ECU 30A of vehicle 2A outputs a request for ending AC charging to AC charging stand 4.

At S66, controller 41 of AC charging stand 4C ends supply of AC power to vehicle 2A in response to the end request. Thus, AC charging ends.

At S67, controller 41 of AC charging stand 4C calculates the integrated value of charging power measured at S64 as the amount of charging power, and transmits the calculated amount of charging power to charging stand management server 6.

At S68, charging stand management server 6 transmits the amount of charging power received from AC charging stand 4C to EMS server 7.

Figure 15:
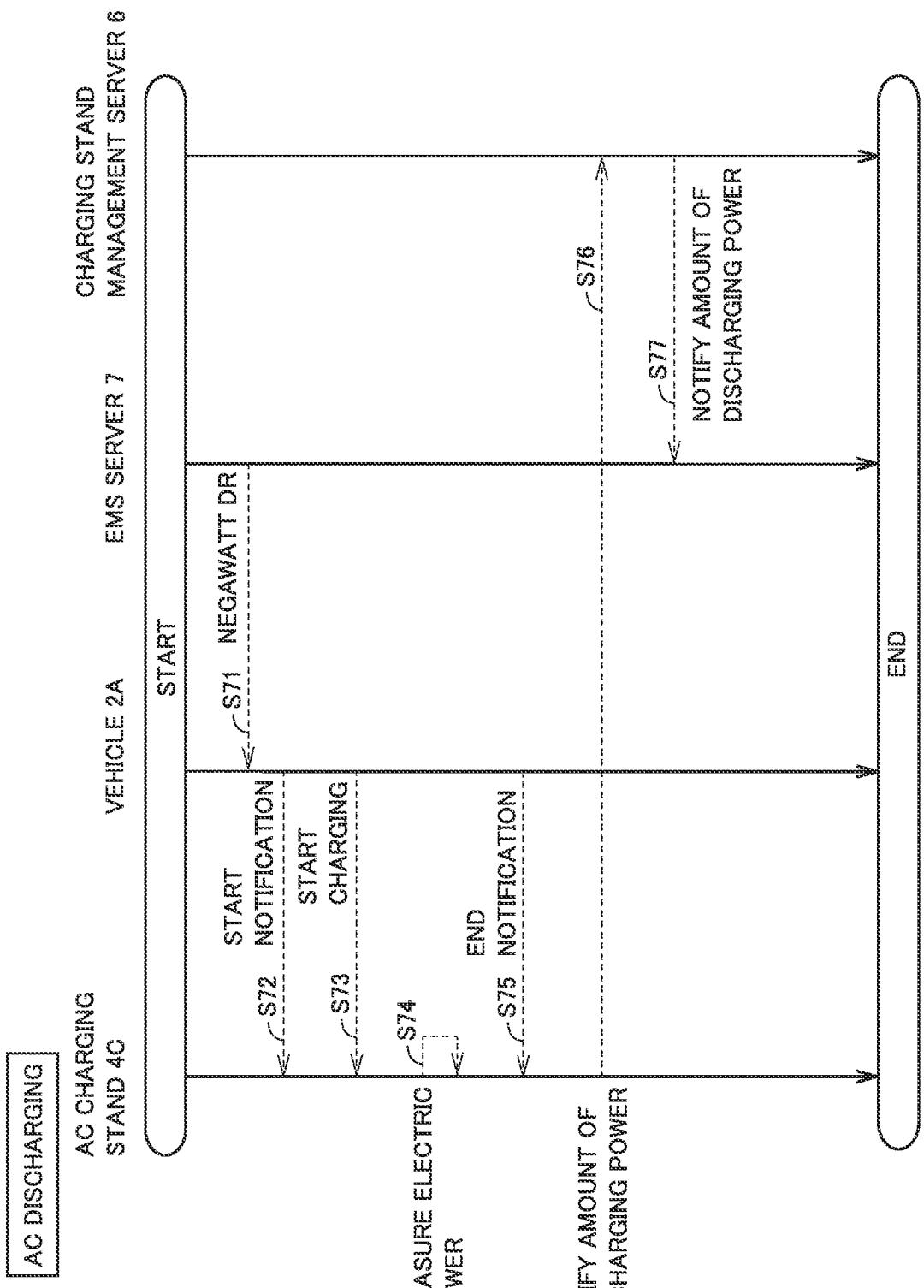
FIG. 15 is a flowchart showing a procedure of a process performed in AC discharging in Embodiment 2.

FIG. 15 is a flowchart showing the procedure of a process performed in AC discharging in Embodiment 2. The process of this flowchart starts, for example, when the condition for performing negawatt DR (a request for reducing an electric power demand) is satisfied. In Embodiment 2, the request for reducing an electric power demand is transmitted directly from EMS server 7 to vehicle 2A.

At S71, EMS server 7 performs negawatt DR to vehicle 2A in response to a request for adjusting supply and demand (reducing an electric power demand) of power grid PG from power transmission and distribution utility server 8.

At S72, the user of vehicle 2A accepts a response to negawatt DR and connects the charging connector of charging cable 44 of AC charging stand 4C to AC inlet 31. The user of vehicle 2A then performs the discharging start operation. When detecting that the discharging start operation has been performed, ECU 30A of vehicle 2A outputs an AC discharging start notification to AC charging stand 4C.

At S73, ECU 30A of vehicle 2A controls charger 33 to start discharging to AC charging stand 4C.

At S74, controller 41 of AC charging stand 4C starts measurement of discharging power supplied from vehicle 2A when AC discharging starts. Controller 41 of AC charging stand 4C continuously measures discharging power supplied from vehicle 2A during AC discharging, that is, while supply of discharging power is being received from vehicle 2A.

At S75, when determining that an AC discharging end condition is satisfied, ECU 30A of vehicle 2A stops supply of discharging power to AC charging stand 4C and outputs an AC discharging end notification to AC charging stand 4C.

At S76, controller 41 of AC charging stand 4C calculates the integrated value of electric power measured at S74 as the amount of discharging power, and transmits the calculated amount of discharging power to charging stand management server 6.

At 577, charging stand management server 6 transmits the amount of discharging power received from AC charging stand 4C to EMS server 7.

In electric power system 1C according to Embodiment 2, in AC charging, AC discharging, DC charging, and DC discharging, AC charging stand 4C and DC charging stand 5 measure electric power and calculate an amount of charging power and an amount of discharging power, as described above. Although a cost and a mon-hour are required for providing voltage sensor 45 and current sensor 46 to AC charging stand 4C, vehicle management server 3 can be omitted.

Embodiment 3

Figure 16:
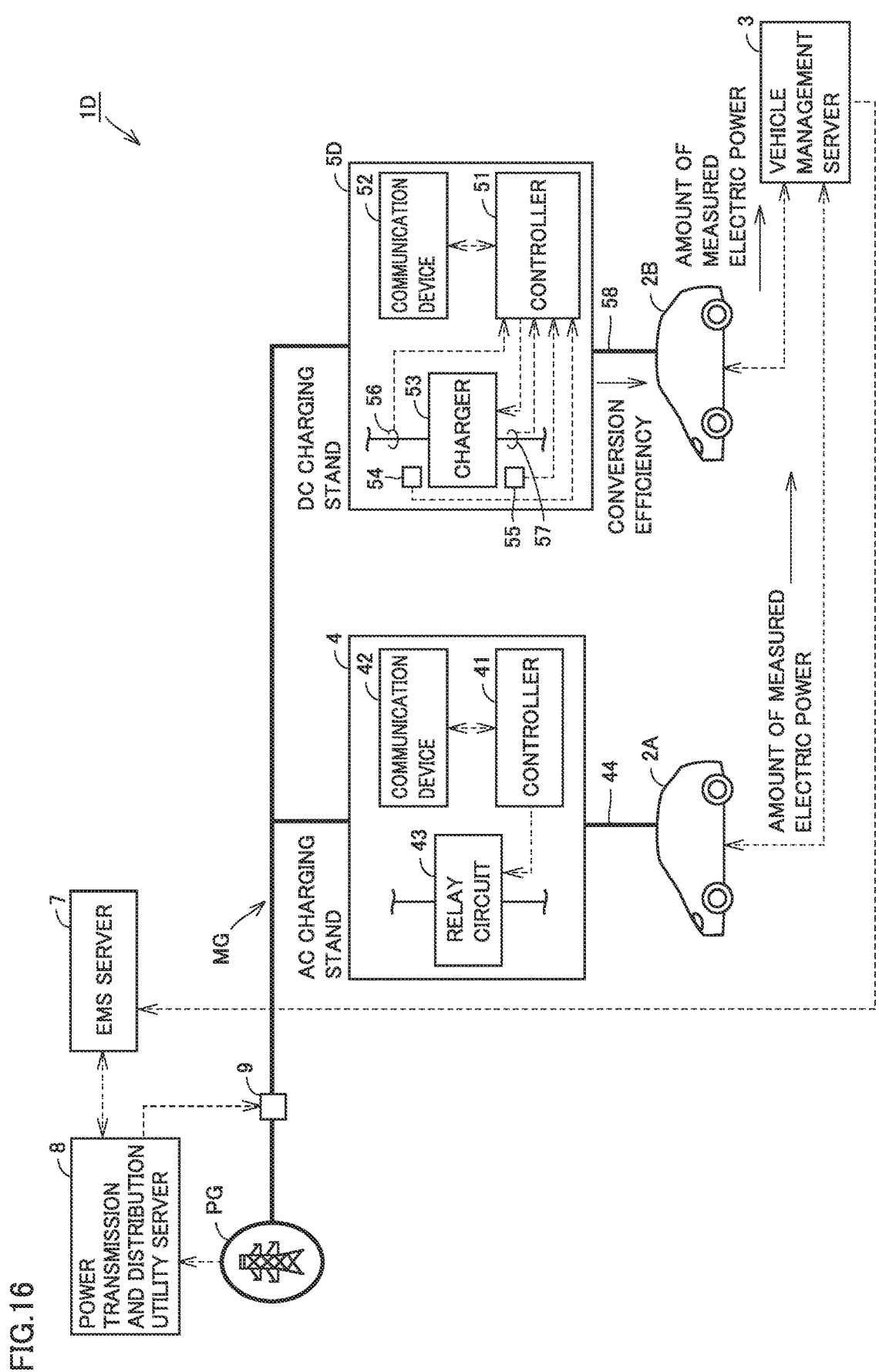
FIG. 16 shows a schematic configuration of an electric power system according to Embodiment 3.

FIG. 16 shows a schematic configuration of an electric power system 1D according to Embodiment 3. Electric power system 1D according to Embodiment 3 is obtained by deleting charging stand management server 6 from electric power system 1 according to Embodiment 1 and replacing DC charging stand 5 with a DC charging stand 5D. Other components of electric power system 1D are similar to the components of electric power system 1, and accordingly have the same reference characters allotted and will not be described repeatedly.

In electric power system 1D, in AC charging, AC discharging, DC charging, and DC discharging, vehicle 2 measures electric power and calculates an amount of charging power and an amount of discharging power. The calculated amount of charging power and the calculated amount of discharging power are transmitted from vehicle 2 to vehicle management server 3, and further from vehicle management server 3 to EMS server 7. The processes performed in AC charging and AC discharging are similar to those of Embodiment 1, and accordingly, will not be described repeatedly.

Controller 51 of DC charging stand 5D is configured to transmit information indicating conversion efficiency of charger 53 to vehicle 2B at the start of DC charging or at the end of DC charging. The conversion efficiency is, for example, calculated in advance based on specifications of charger 53 and is stored in a storage device (not shown) or the like included in DC charging stand 5D. Controller 51 reads the information indicating conversion efficiency from the storage device and transmits the read information indicating conversion efficiency to vehicle 2B via communication device 52.

In DC charging, ECU 30B of vehicle 2B measures charging power using a detection value (voltage VB) of voltage sensor 22 and a detection value (current IB) of current sensor 23 of monitoring unit 21. ECU 30B integrates the charging power measured during DC charging to calculate an amount of charging power in DC charging. ECU 30B then calculates an amount of charging power supplied from power distribution system 10 using the amount of charging power in DC charging and the information indicating the conversion efficiency received from DC charging stand 5. For example, the amount of charging power supplied from power distribution system 10 may be calculated by dividing the amount of charging power in DC charging by the conversion efficiency, as expressed by Equation (1) below.

Amount of charging power supplied from power distribution system 10=amount of charging power/conversion efficiency in DC charging (1)

The use of the information on conversion efficiency can calculate an amount of charging power without a loss amount of power conversion by charger 53. Accordingly, the amount of charging power supplied from power distribution system 10 can be calculated accurately.

In DC discharging, ECU 30B of vehicle 2B measures discharging power using the detection value (voltage VB) of voltage sensor 22 and the detection value (current IB) of current sensor 23 of monitoring unit 21. ECU 30B integrates the discharging power measured during DC discharging to calculate an amount of discharging power in DC discharging. The calculated amount of discharging power includes no power conversion loss. The amount of discharging power supplied from vehicle 2B to DC charging stand 5 can thus be calculated accurately. When it is desired to take an actual amount of electric power supplied to power distribution system 10 as the amount of discharging power, the information indicating the conversion efficiency of charger 53 in DC discharging may be obtained from DC charging stand 5, and an amount of discharging power supplied to power distribution system 10 may be calculated using this information indicating conversion efficiency.

ECU 30B transmits the calculated amount of charging power and the calculated amount of discharging power to vehicle management server 3 via communication device 29B. Vehicle management server 3 transmits the amount of charging power and the amount of discharging power to EMS server 7. This allows EMS server 7 to properly manage the supply and demand state of microgrid MG.

Figure 17:
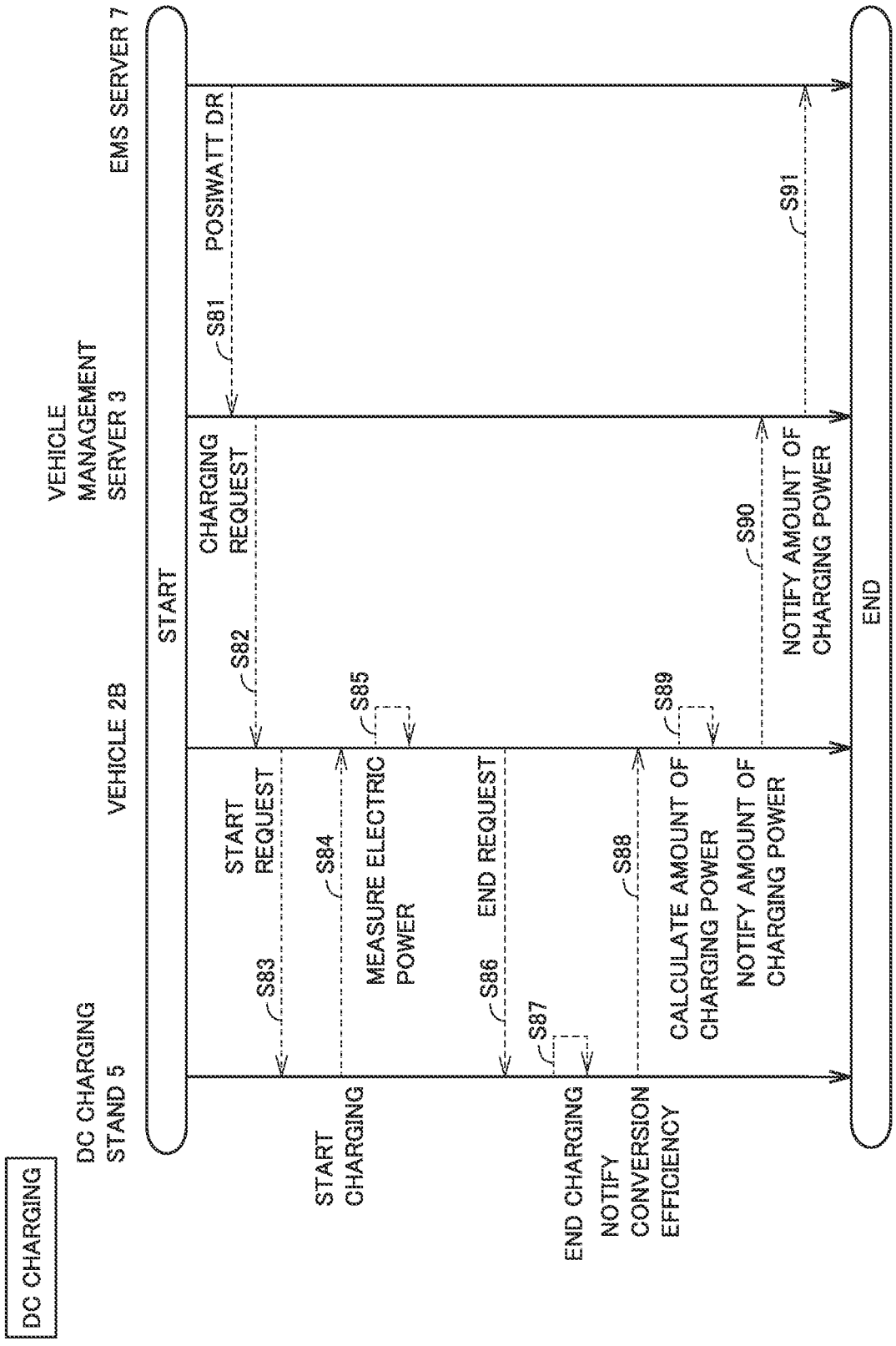
FIG. 17 is a flowchart showing a procedure of a process performed in DC charging in Embodiment 3.

FIG. 17 is a flowchart showing the procedure of a process performed in DC charging in Embodiment 3. The process of this flowchart starts, for example, when the condition for performing posiwatt DR (a request for increasing electric power demand) is satisfied.

At S81, EMS server 7 requests posiwatt DR from vehicle management server 3 in response to a request for adjusting supply and demand (increasing electric power demand) of power grid PG from power transmission and distribution utility server 8.

At S82, vehicle management server 3 transmits a charging request to vehicle 2B in response to posiwatt DR.

At S83, the user of vehicle 2B accepts a response to posiwatt DR and connects the charging connector of charging cable 58 of DC charging stand 5D to DC inlet 38. The user of vehicle 2B then performs the charging start operation. When detecting that the charging start operation has been performed, ECU 30B of vehicle 2B outputs a request for starting DC charging to DC charging stand 5D.

At S84, controller 51 of DC charging stand 5D starts supply of DC power to vehicle 2B in response to the start request. Thus, DC charging starts.

At S85, ECU 30B of vehicle 2B starts measurement of charging power supplied from DC charging stand 5D when DC charging starts. ECU 30B of vehicle 2B continuously measures the charging power received from DC charging stand 5D during DC charging, that is, while supply of charging power is being received from DC charging stand 5D.

At S86, when determining that a condition for ending DC charging is satisfied, ECU 30B of vehicle 2B outputs a request for ending DC charging to DC charging stand 5D.

At S87, controller 51 of DC charging stand 5D ends supply of DC power to vehicle 2B in response to the end request. Thus, DC charging ends.

At S88, controller 51 of DC charging stand 5D notifies vehicle 2B of the information indicating the conversion efficiency of charger 53 in DC charging.

At S89, ECU 30B of vehicle 2B calculates an amount of charging power using the integrated value of charging power measured at S85 and the information indicating conversion efficiency.

At S90, ECU 30B of vehicle 2B transmits the amount of charging power calculated at S89 to vehicle management server 3.

At S91, vehicle management server 3 transmits the amount of charging power received from vehicle 2B to EMS server 7.

Figure 18:
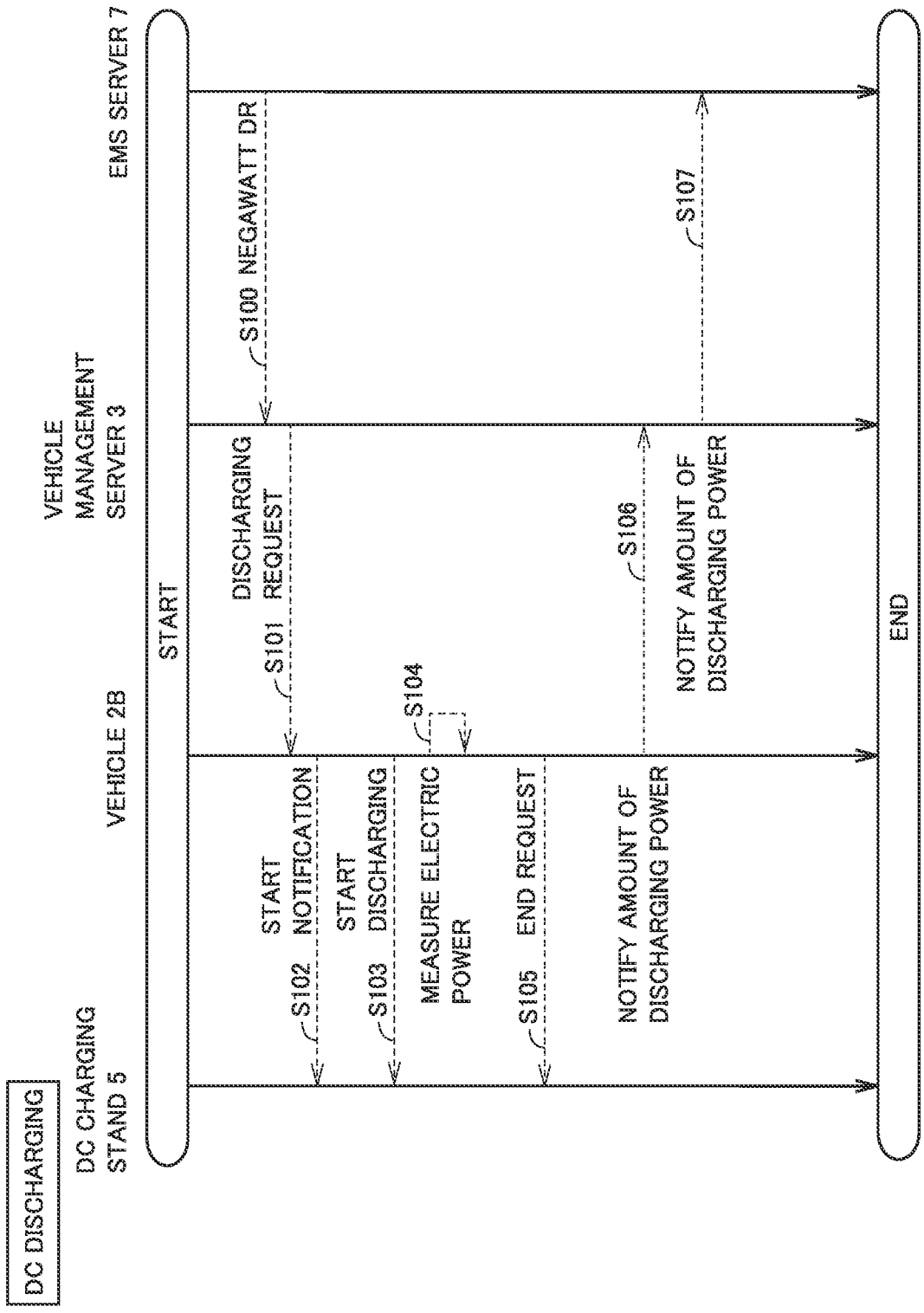
FIG. 18 is a flowchart showing a procedure of a process performed in DC discharging in Embodiment 3.

FIG. 18 is a flowchart showing the procedure of a process performed in DC discharging in Embodiment 3. The process of this flowchart starts, for example, when the condition for performing negawatt DR (a request for reducing an electric power demand) is satisfied.

At S100, EMS server 7 performs negawatt DR to vehicle management server 3 in response to a request for adjusting supply and demand (reducing an electric power demand) of power grid PG from power transmission and distribution utility server 8.

At S101, vehicle management server 3 transmits a discharging request to vehicle 2B in response to negawatt DR.

At S102, the user of vehicle 2B accepts a response to negawatt DR and connects the charging connector of charging cable 58 of DC charging stand 5D to DC inlet 38. The user of vehicle 2B then performs the discharging start operation. When detecting that the discharging start operation has been performed, ECU 30B of vehicle 2B outputs a DC discharging start notification to DC charging stand 5D.

At S103, ECU 30B of vehicle 2B starts discharging to DC charging stand 5D.

At S104, ECU 30B of vehicle 2B starts measurement of discharging power supplied from battery 20B to DC charging stand 5D when DC discharging starts. ECU 30B of vehicle 2B continuously measures discharging power supplied to DC charging stand 5D during DC discharging.

At S105, when determining that the condition for ending DC discharging is satisfied, ECU 30B of vehicle 2B stops supply of discharging power to DC charging stand 5D and outputs a DC discharging end notification to DC charging stand 5D.

At S106, ECU 30B of vehicle 2B calculates the integrated value of discharging power measured at S104 as the amount of discharging power, and transmits the calculated amount of discharging power to vehicle management server 3.

At S107, vehicle management server 3 transmits the amount of discharging power received from vehicle 2B to EMS server 7.

In electric power system 1D according to Embodiment 3, vehicles 2A, 2B measure electric power and calculates an amount of charging power and an amount of discharging power in AC charging, AC discharging, DC charging, and DC discharging, as described above. As a result, charging stand management server 6 can be omitted.

In DC charging, DC charging stand 5D transmits the information indicating conversion efficiency of charger 53 to vehicle 2B. Vehicle 2B calculates an amount of charging power using the information indicating conversion efficiency. Thus, the amount of charging power supplied from power distribution system 10 can be calculated accurately. A single value (e.g., 90%) can be stored in vehicle 2 in advance as conversion efficiency.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An electric power system comprising:
   a vehicle that performs
     external charging of charging a battery with electric power supplied from outside the vehicle, and
     external discharging of supplying electric power of the battery to outside the vehicle;
   a charging stand that transfers electric power between an AC power supply outside the vehicle and the vehicle in the external charging and the external discharging; and
   a server that communicates with the vehicle and the charging stand, wherein
   in the external charging and the external discharging, when electric power transferred between the vehicle and the charging stand is AC power,
     the vehicle includes
       a first charger that converts AC power supplied from the charging stand into DC power and converts DC power supplied from the battery into AC power, and
       a first detector that detects electric power input to and output from the first charger, and
     the vehicle measures charging power supplied from the charging stand or discharging power supplied to the charging stand using a detection value of the first detector, and transmits, to the server, a first measurement value that is a result of the measurement, and
   in the external charging and the external discharging, when the electric power transferred between the vehicle and the charging stand is DC power,
     the charging stand includes
       a second charger that converts AC power supplied from the AC power supply into DC power and converts DC power supplied from the vehicle into AC power, and
       a second detector that detects electric power input to and output from the second charger, and
     the charging stand measures charging power supplied to the vehicle or discharging power supplied from the vehicle using a detection value of the second detector, and transmits, to the server, a second measurement value that is a result of the measurement.

2. The electric power system according to claim 1, wherein
   the vehicle and the charging stand are configured to communicate with each other,
   the charging stand is configured to transmit the second measurement value to the vehicle, and
   the vehicle is configured to transmit the second measurement value to the server.

3. The electric power system according to claim 2, wherein when the charging stand fails to communicate with the server, the charging stand transmits the second measurement value to the vehicle.

4. The electric power system according to claim 1, wherein
the vehicle and the charging stand are configured to communicate with each other,
the vehicle is configured to transmit the first measurement value to the charging stand, and
the charging stand is configured to transmit the first measurement value to the server.

5. The electric power system according to claim 4, wherein when the vehicle fails to communicate with the server, the vehicle transmits the first measurement value to the charging stand.

6. The electric power system according to claim 1, wherein
the server includes
a first server that manages the vehicle, and
a second server that manages the charging stand,
the first server and the second server are configured to communicate with each other,
the vehicle transmits the first measurement value to the first server,
the charging stand transmits the second measurement value to the second server, and
the first server and the second server share the first measurement value and the second measurement value.

7. An electric power calculation method of calculating, in an electric power system including a vehicle, a charging stand, and a server, an amount of electric power transferred by the vehicle,
the vehicle being configured to perform
external charging of charging a battery with electric power supplied from outside the vehicle, and
external discharging of supplying electric power of the battery to outside the vehicle,
the charging stand being configured to transfer electric power between an AC power supply outside the vehicle and the vehicle in the external charging and the external discharging,
the server being configured to communicate with the vehicle and the charging stand,
in the external charging and the external discharging, when electric power transferred between the vehicle and the charging stand is AC power, the vehicle including
a first charger that converts AC power supplied from the charging stand into DC power and converts DC power supplied from the battery into AC power, and
a first detector that detects electric power input to and output from the first charger,
the electric power calculation method comprising:
measuring, by the vehicle, charging power supplied from the charging stand or discharging power supplied to the charging stand using a detection value of the first detector; and
transmitting, by the vehicle to the server, a first measurement value that is a result of the measurement, and
in the external charging and the external discharging, when electric power transferred between the vehicle and the charging stand is DC power,
the charging stand including
a second charger that converts AC power supplied from the AC power supply into DC power and converts DC power supplied from the vehicle into AC power, and
a second detector that detects electric power input to and output from the second charger, and
the electric power calculation method further comprising:
measuring, by the charging stand, charging power supplied to the vehicle or discharging power supplied from the vehicle using a detection value of the second detector; and
transmitting, by the charging stand to the server, a second measurement value that is a result of the measurement.

8. An electric power system comprising:
a vehicle that performs
external charging of charging a battery with electric power supplied from outside the vehicle, and
external discharging of supplying electric power of the battery to outside the vehicle,
a charging stand that transfers electric power between an AC power supply outside the vehicle and the vehicle in the external charging and the external discharging; and
a server that communicates with the charging stand, wherein
in the external charging and the external discharging, when electric power transferred between the vehicle and the charging stand is AC power,
the charging stand includes a first detector that detects charging power supplied to the vehicle and discharging power supplied from the vehicle, and
the charging stand measures the charging power or the discharging power using a detection value of the first detector, and transmits, to the server, a first measurement value that is a result of the measurement, and
in the external charging and the external discharging, when the electric power transferred between the vehicle and the charging stand is DC power,
the charging stand includes
a charger that converts AC power supplied from the AC power supply into DC power and converts DC power supplied from the vehicle into AC power, and
a second detector that detects electric power input to and output from the charger, and
the charging stand measures charging power supplied to the vehicle or discharging power supplied from the vehicle using a detection value of the second detector, and transmits, to the server, a second measurement value that is a result of the measurement.

* * * * *